(12) United States Patent
Zhu et al.

(10) Patent No.: US 12,704,739 B2
(45) Date of Patent: Aug. 11, 2026

(54) EYE-MOVEMENT TRACKING APPARATUS AND ELECTRONIC DEVICE

(71) Applicant: Huawei Technologies Co., Ltd., Shenzhen (CN)

(72) Inventors: Shuaishuai Zhu, Dongguan (CN); Yunfeng Jin, Shenzhen (CN); Xiaowen Zheng, Dongguan (CN); Zixuan He, Dongguan (CN); Qi Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 529 days.

(21) Appl. No.: 18/254,812

(22) PCT Filed: Nov. 25, 2021

(86) PCT No.: PCT/CN2021/133281
§ 371 (c)(1),
(2) Date: May 26, 2023

(87) PCT Pub. No.: WO2022/111601
PCT Pub. Date: Jun. 2, 2022

(65) Prior Publication Data

US 2023/0418083 A1 Dec. 28, 2023

(30) Foreign Application Priority Data

Nov. 27, 2020 (CN) ......................... 202011360307.4

(51) Int. Cl.
*G02B 27/28* (2006.01)
*G02B 27/00* (2006.01)

(52) U.S. Cl.
CPC ....... *G02B 27/286* (2013.01); *G02B 27/0093* (2013.01); *G02B 27/281* (2013.01)

(58) Field of Classification Search
CPC ............. G02B 27/286; G02B 27/0093; G02B 27/281; G02B 27/0018; G02B 27/0172;
(Continued)

(56) References Cited

U.S. PATENT DOCUMENTS 10,429,927 B1 * 10/2019 Sharma ................. G06F 3/0346
10,474,229 B1 11/2019 Gollier et al.
(Continued)

FOREIGN PATENT DOCUMENTS

CN 109725416 A 5/2019
CN 110161699 A 8/2019
(Continued)

OTHER PUBLICATIONS

Virtual Reality Display Device; CN110161699, Qiu et al. (Year: 2019).*

*Primary Examiner* — Wyatt A Stoffa
*Assistant Examiner* — Rahman Abdur
(74) *Attorney, Agent, or Firm* — Slater Matsil, LLP

(57) ABSTRACT

An eye-movement tracking apparatus and an electronic device are provided. The eye-movement tracking apparatus includes a light source, a lens group, a hot mirror, and a compact camera module. The light source is configured to emit a light ray to an eyeball of a user. The light ray is reflected by the eyeball to form a first light ray and a second light ray that are emitted to the lens group. The first light ray is reflected by the hot mirror for N times to form a third light ray. The second light ray is reflected by the hot mirror for M times to form a fourth light ray. Both M and N are natural numbers, and M and N are different. The optical component allow the third light ray to enter the image sensor, and prevent the fourth light ray from entering the image sensor.

20 Claims, 14 Drawing Sheets

(58) Field of Classification Search
CPC ........ G02B 2027/0187; G02B 27/0179; G06F 3/013
USPC .......................................................... 351/210
See application file for complete search history.

(56) References Cited

U.S. PATENT DOCUMENTS

| | | | | |
|---|---|---|---|---|
| 2016/0011341 | A1* | 1/2016 | Smith | G02B 3/08 359/743 |
| 2017/0176749 | A1 | 6/2017 | Ouderkirk et al. | |
| 2017/0308160 | A1 | 10/2017 | Yoon | |
| 2018/0239146 | A1* | 8/2018 | Bierhuizen | G02B 17/0856 |
| 2020/0125169 | A1 | 4/2020 | Chappell et al. | |

FOREIGN PATENT DOCUMENTS

| | | | |
|---|---|---|---|
| CN | 209265082 | U | 8/2019 |
| CN | 209356760 | U | 9/2019 |
| CN | 209728302 | U | 12/2019 |
| WO | 2018156941 | A1 | 8/2018 |

* cited by examiner 221 222 224 23 27 26 24
200
90°
L
0°
R
R
R
R
0°
90°
L
L
0°
241
y
x
z

EYE-MOVEMENT TRACKING APPARATUS AND ELECTRONIC DEVICE

CROSS-REFERENCE TO RELATED APPLICATIONS

This application is a national stage of International Application No. PCT/CN2021/133281, filed on Nov. 25, 2021, which claims priority to Chinese Patent Application No. 202011360307.4, filed on Nov. 27, 2020. Both of the aforementioned applications are hereby incorporated by reference in their entireties.

TECHNICAL FIELD

This application relates to the field of electronic devices, and in particular, to an eye-movement tracking apparatus and an electronic device.

BACKGROUND

A principle of an eye-movement tracking technology is that light (usually light in an infrared area) is reflected from an eyeball of a user and sensed by a compact camera module. Information sensed by a camera is then analyzed, to extract a gaze direction or pupil position from a reflection change. An eye-movement apparatus for tracking an eye movement includes components such as a light source and a compact camera module. The light source is configured to emit light to the eyeball of the user, and the light is reflected by the eyeball of the user and finally enters the compact camera module and is sensed by the compact camera module. However, a compact camera module in an existing eye-movement tracking apparatus may photograph light rays that pass through different paths, and the light rays of different paths are superimposed in the compact camera module and form a ghost image. The ghost image affects algorithm calculation performed by the eye-movement tracking apparatus, and reduces eye-movement tracking precision.

SUMMARY

An objective of this application is to provide an eye-movement tracking apparatus and an electronic device including the eye-movement tracking apparatus, to prevent light rays of different paths from all entering a compact camera module, and improve eye-movement tracking precision of the eye-movement tracking apparatus.

According to a first aspect, this application provides an eye-movement tracking apparatus. The eye-movement tracking apparatus includes a light source, a lens group, a hot mirror and a compact camera module. The hot mirror is disposed on an out-light side of the lens group. The compact camera module includes an image sensor and an optical component located on an in-light side of the image sensor. The light source is configured to emit a light ray to an eyeball of a user. The light ray is reflected by the eyeball to form a first light ray and a second light ray that are emitted to the lens group. The first light ray is reflected by the hot mirror for N times to form a third light ray. The second light ray is reflected by the hot mirror for M times to form a fourth light ray. Both M and N are natural numbers, and M and N are different. The optical component can allow the third light ray to enter the image sensor, and prevent the fourth light ray from entering the image sensor.

The optical component is disposed on the in-light side of the image sensor of the compact camera module provided in this application. After the light ray emitted by the light source is reflected by the hot mirror for different times, the third light ray and the fourth light ray that have different propagation paths are formed. The optical component can allow the third light ray to enter the image sensor, and prevent the fourth light ray from entering the image sensor. For example, the third light ray is a light ray formed by reflecting the first light ray once by the hot mirror, and the fourth light ray is a light ray formed by reflecting the second light ray zero times by the hot mirror. It may be understood that propagation paths of the third light ray and the fourth light ray are different, and polarization states of the third light ray and the fourth light ray are also different. In this application, the optical component is disposed on an in-light side of the compact camera module, and the polarization states of the third light ray and the fourth light ray are selected, to allow a light ray (the light ray of the predetermined path is a light ray reflected by the hot mirror for predetermined times, and the light ray of the predetermined path in this embodiment is the third light ray) of a predetermined path to pass, and block a light ray (that is, a light ray of another path other than the third light ray, for example, the fourth light ray) of another path. Only the light ray of the predetermined path can enter the image sensor of the compact camera module, and a clean and clear image is formed by photographing by the compact camera module, so that light rays of a plurality of different paths are prevented from all entering the image sensor and being photographed by the compact camera module, and a ghost image is not formed. This helps the eye-movement tracking apparatus perform an algorithm technology, improves eye-movement tracking precision, and further improves user experience.

In a possible implementation, the lens group includes a reflective polaroid sheet, a first wave plate, and a lens. The first wave plate is disposed on an in-light side of the lens, the reflective polaroid sheet is disposed on a side that is of the first wave plate and that faces away from the lens, and the optical component includes a first linear polaroid sheet and a second wave plate. The first linear polaroid sheet is located between the second wave plate and the image sensor, a polarization direction of the reflective polaroid sheet is the same as or perpendicular to that of the first linear polaroid sheet, and both the first wave plate and the second wave plate are quarter-wave plates. When the polarization direction of the reflective polaroid sheet is the same as that of the first linear polaroid sheet, the first linear polaroid sheet and the second wave plate allow the third light ray to enter the image sensor, and prevent the fourth light ray from entering the image sensor. When the polarization direction of the reflective polaroid sheet is perpendicular to that of the first linear polaroid sheet, the first linear polaroid sheet and the second wave plate allow the fourth light ray to enter the image sensor, and prevent the third light ray from entering the image sensor. In this embodiment, the first linear polaroid sheet and the second wave plate are used, and a polarization selection manner is used, to allow the light ray of the predetermined path to enter the image sensor. This effectively reduces ghost images.

In a possible implementation, the lens group includes a reflective polaroid sheet, a first wave plate, and a lens. The first wave plate is disposed on an in-light side of the lens, the reflective polaroid sheet is disposed on a side that is of the first wave plate and that faces away from the lens, and the optical component includes a first circular polaroid sheet. A rotation direction of the first circular polaroid sheet is the same as that of the first wave plate, and a polarization direction of the first circular polaroid sheet is the same as or perpendicular to that of the reflective polaroid sheet. When the polarization direction of the first circular polaroid sheet is the same as that of the reflective polaroid sheet, the first circular polaroid sheet allows the third light ray to enter the image sensor, and prevents the fourth light ray from entering the image sensor. When the polarization direction of the first circular polaroid sheet is perpendicular to that of the reflective polaroid sheet, the first circular polaroid sheet allows the fourth light ray to enter the image sensor, and prevents the third light ray from entering the image sensor. In this embodiment, a second circular linear polaroid sheet is used, and a polarization selection manner is used, to allow the light ray of the predetermined path to enter the image sensor. This effectively reduces ghost images.

In a possible implementation, the lens group includes a semi-reflective semi-transmissive film, and the semi-reflective semi-transmissive film is disposed on a side that is of the lens and that faces away from the first wave plate. Light from a display screen is attenuated by using the semi-reflective semi-transmissive film, to reduce a brightness difference existing when the user views the display screen, and help improve use experience of the user when the user views the display screen.

In a possible implementation, a transmittance of the semi-reflective semi-transmissive film in a first band is greater than 95%, and a reflectivity is less than 1%, where the first band is a frequency band to which the light ray belongs. When the light ray emitted by the light source passes through the semi-reflective semi-transmissive film, most of the light ray can be emitted from the semi-reflective semi-transmissive film, and an extremely small part of the light ray is reflected. In this solution, light rays that are reflected by the semi-reflective semi-transmissive film and that finally enter the compact camera module can be effectively reduced, and formed ghost images are reduced. In addition, a loss of intensity of the first light ray can be reduced, so that intensity of the third light ray formed by reflecting by the hot mirror is large enough, intensity of the third light ray that is finally received by the compact camera module is ensured to be large enough, and the compact camera module can recognize the clear third light ray. This helps the eye-movement tracking apparatus perform the algorithm technology, improves eye-movement tracking precision, and further improves user experience.

In a possible implementation, the in-light side of the compact camera module faces the hot mirror, and is configured to receive a light ray reflected by the hot mirror; or the in-light side of the compact camera module faces the lens group, and is configured to receive a light ray emitted from the lens group. In this embodiment, an orientation of the compact camera module may be flexibly set by selecting the light ray of the predetermined path.

According to a second aspect, this application provides another eye-movement tracking apparatus. The eye-movement tracking apparatus includes a light source, a polarizer, a hot mirror and a compact camera module. The hot mirror is located on an out-light side of the polarizer, the compact camera module is disposed on a side that is of the polarizer and that faces away from the hot mirror, and the light source is configured to emit a light ray to an eyeball of a user. The light ray is reflected by the eyeball to form a first light ray and a second light ray that are emitted to the polarizer. After being propagated between the polarizer and the hot mirror, the first light ray is emitted from a first area of the polarizer, and after being propagated between the polarizer and the hot mirror, the second light ray is emitted from a second area of the polarizer. A receive field of view of the compact camera module covers the first area and staggers the second area.

The compact camera module in this application is disposed on the side that is of the polarizer and that faces away from the hot mirror. Because of a characteristic of the polarizer, before being emitted from the polarizer, light rays (such as the first light ray and the second light ray) that enter a lens group from different directions need to be reflected twice by the hot mirror. In this way, a distance between a position at which the first light ray is emitted from the polarizer and a position at which the second light ray is emitted from the polarizer is large, so that the second light ray cannot enter the compact camera module even when the second light ray is emitted from the polarizer. Therefore, only a light ray of a predetermined path can enter the compact camera module, and a clean and clear image is formed by photographing by the compact camera module, so that light rays of a plurality of different paths are prevented from all entering the compact camera module and being photographed by the compact camera module, and a ghost image is not formed. This helps the eye-movement tracking apparatus perform an algorithm technology, improves eye-movement tracking precision, and further improves user experience.

In a possible implementation, the polarizer includes a reflective polaroid sheet and a first wave plate, and the first wave plate is located between the reflective polaroid sheet and the hot mirror. In this embodiment, the reflective polaroid sheet and the first wave plate are used, and a polarization selection manner is used, to allow the light ray of the predetermined path to enter an image sensor. This effectively reduces ghost images.

In a possible implementation, the compact camera module includes the image sensor and a polaroid sheet located on an in-light side of the image sensor. The light ray reflected by the eyeball further forms a third light ray emitted to the polarizer, and the third light ray is reflected by the polarizer to the compact camera module. The polaroid sheet is configured to: allow the first light ray emitted from the first area to enter the image sensor, and prevent the third light ray reflected by the polarizer to the compact camera module from entering the image sensor. It may be understood that a polarization state and a propagation path of the third light ray are different from polarization states and propagation paths of the first light ray and the second light ray that are respectively emitted from the first area and the second area. In other words, in this embodiment, the polaroid sheet is disposed on the in-light side of the image sensor of the compact camera module, to prevent the third light ray that is reflected by the polarizer to the compact camera module from entering the image sensor, and reduce ghost images caused by light rays of other propagation paths.

In a possible implementation, the eye-movement tracking apparatus further includes a semi-reflective semi-transmissive film, and the semi-reflective semi-transmissive film is located between the first wave plate and the hot mirror. Light from a display screen is attenuated by using the semi-reflective semi-transmissive film, to reduce a brightness difference existing when the user views the display screen, and help improve use experience of the user when the user views the display screen.

In a possible implementation, a transmittance of the semi-reflective semi-transmissive film in a first band is greater than 95%, and a reflectivity is less than 1%, where the first band is a frequency band to which the light ray belongs. When the light ray emitted by the light source passes through the semi-reflective semi-transmissive film, most of the light ray can be emitted from the semi-reflective semi-transmissive film, and an extremely small part of the light ray is reflected. In this solution, light rays that are reflected by the semi-reflective semi-transmissive film and that finally enter the compact camera module can be effectively reduced, and formed ghost images are reduced. In addition, a loss of intensity of the first light ray can be reduced, so that intensity of the first light ray is large enough, intensity of the first light ray that is finally received by the compact camera module is ensured to be large enough, and the compact camera module can recognize the clear first light ray. This helps the eye-movement tracking apparatus perform the algorithm technology, improves eye-movement tracking precision, and further improves user experience.

In a possible implementation, the eye-movement tracking apparatus further includes a lens, and the lens is disposed between the first wave plate and the semi-reflective semi-transmissive film.

In a possible implementation, an in-light side of the compact camera module faces the reflective polaroid sheet, and is configured to receive a light ray emitted from the polarizer. In this embodiment, an orientation of the compact camera module may be set by selecting the light ray of the predetermined path.

In a possible implementation, the eye-movement tracking apparatus further includes a reflector, and the reflector is configured to reflect the light ray to the in-light side of the compact camera module, so that the compact camera module is disposed more flexibly.

According to a third aspect, this application further provides an electronic device. The electronic device includes a display screen and the foregoing eye-movement tracking apparatus, where the display screen is disposed on a side that is of a hot mirror and that faces away from a lens group or a polarizer. The electronic device having the eye-movement tracking apparatus in this application has high eye-movement tracking precision.

In a possible implementation, the display screen includes a light-passing area. A compact camera module is disposed on a side that is of the display screen and that faces away from the hot mirror, and an in-light side of the compact camera module is disposed directly opposite to the light-passing area. In other words, the compact camera module is disposed below the display screen. It may be understood that below the display screen is a side that is of the display screen and that faces away from a display surface of the display screen. In this embodiment, in comparison with disposing the compact camera module at another position such as between the lens group and the hot mirror, no space for installing the compact camera module needs to be reserved between the lens group and the hot mirror. This facilitates miniaturization of the electronic device.

In a possible implementation, the electronic device further includes a frame, where the frame includes a body and temples connected to the body. The lens group or the polarizer, and the display screen are fastened to the body, and a light source and the compact camera module are fastened to the body or the temples.

In a possible implementation, the electronic device further includes a second linear polaroid sheet and a third wave plate. The second linear polaroid sheet is disposed on an out-light side of the display screen, and the third wave plate is disposed between the second linear polaroid sheet and the hot mirror. In this application, the second linear polaroid sheet and the third wave plate are disposed between the display screen and the lens group, so that a part that is of a light ray that is emitted from the display screen and that is returned to the display screen after being reflected by the lens group can be intercepted. This reduces a ghost phenomenon of the electronic device generated because of reflection of the light ray, and enables a user to view a clearer image.

According to a fourth aspect, this application provides a head-mounted display device. The head-mounted display device includes a light source, a lens group, a hot mirror, a display screen, and a compact camera module. The lens group includes a reflective polaroid sheet, a first wave plate, a lens, and a semi-reflective semi-transmissive film. The first wave plate is disposed on an in-light side of the lens, the semi-reflective semi-transmissive film is disposed on an out-light side of the lens, and the reflective polaroid sheet is disposed on a side that is of the first wave plate and that faces away from the lens, the light source is disposed on a side that is of the reflective polaroid sheet and that faces away from the first wave plate, the display screen is disposed on a side that is of the semi-reflective semi-transmissive film and that faces away from the lens, and the hot mirror is located between the display screen and the semi-reflective semi-transmissive film. The compact camera module includes an image sensor and an optical component located on an in-light side of the image sensor. The light source is configured to emit a light ray to an eyeball of a user, and the light ray is reflected by the eyeball to form a first light ray and a second light ray that are emitted to the lens group. The first light ray is reflected by the hot mirror for N times to form a third light ray, and the second light ray is reflected by the hot mirror for M times to form a fourth light ray. Both M and N are natural numbers, and M and N are different. The optical component can allow the third light ray to enter the image sensor, and prevent the fourth light ray from entering the image sensor.

The optical component is disposed on the in-light side of the image sensor of the compact camera module provided in this application. After the light ray emitted by the light source is reflected by the hot mirror for different times, the third light ray and the fourth light ray that have different propagation paths are formed. The optical component can allow the third light ray to enter the image sensor, and prevent the fourth light ray from entering the image sensor. For example, the third light ray is a light ray formed by reflecting the first light ray once by the hot mirror, and the fourth light ray is a light ray formed by reflecting the second light ray zero times by the hot mirror. It may be understood that propagation paths of the third light ray and the fourth light ray are different, and polarization states of the third light ray and the fourth light ray are also different. In this application, the optical component is disposed on an in-light side of the compact camera module, and the polarization states of the third light ray and the fourth light ray are selected, to allow a light ray (the light ray of the predetermined path is a light ray reflected by the hot mirror for predetermined times, and the light ray of the predetermined path in this embodiment is the third light ray) of a predetermined path to pass, and block a light ray (that is, a light ray of another path other than the third light ray, for example, the fourth light ray) of another path. Only the light ray of the predetermined path can enter the image sensor of the compact camera module, and a clean and clear image is formed by photographing by the compact camera module, so that light rays of a plurality of different paths are prevented from all entering the image sensor and being photographed by the compact camera module, and a ghost image is not formed. This helps an eye-movement tracking apparatus perform an algorithm technology, improves eye-movement tracking precision, and further improves user experience.

In a possible implementation, a transmittance of the semi-reflective semi-transmissive film in a first band is greater than 95%, and a reflectivity is less than 1%, where the first band is a frequency band to which the light ray belongs. When the light ray emitted by the light source passes through the semi-reflective semi-transmissive film, most of the light ray can be emitted from the semi-reflective semi-transmissive film, and an extremely small part of the light ray is reflected. In this solution, light rays that are reflected by the semi-reflective semi-transmissive film and that finally enter the compact camera module can be effectively reduced, and formed ghost images are reduced. In addition, a loss of intensity of the first light ray can be reduced, so that intensity of the third light ray formed by reflecting by the hot mirror is large enough, intensity of the third light ray that is finally received by the compact camera module is ensured to be large enough, and the compact camera module can recognize the clear third light ray. This helps the eye-movement tracking apparatus perform the algorithm technology, improves eye-movement tracking precision, and further improves user experience.

In a possible implementation, the in-light side of the compact camera module faces the hot mirror, and is configured to receive a light ray reflected by the hot mirror; or the in-light side of the compact camera module faces the lens group, and is configured to receive a light ray emitted from the lens group. In this embodiment, an orientation of the compact camera module may be flexibly set by selecting the light ray of the predetermined path.

In a possible implementation, the eye-movement tracking apparatus further includes a reflector, and the reflector is configured to reflect the light ray to the in-light side of the compact camera module, so that the compact camera module is disposed more flexibly.

In a possible implementation, the display screen includes a light-passing area. The compact camera module is disposed on a side that is of the display screen and that faces away from the hot mirror, and the in-light side of the compact camera module is disposed directly opposite to the light-passing area. In other words, the compact camera module is disposed below the display screen. It may be understood that below the display screen is a side that is of the display screen and that faces away from a display surface of the display screen. In this embodiment, in comparison with disposing the compact camera module at another position such as between the lens group and the hot mirror, no space for installing the compact camera module needs to be reserved between the lens group and the hot mirror. This facilitates miniaturization of the head-mounted display device.

In a possible implementation, the head-mounted display device further includes a frame, where the frame includes a body and temples connected to the body. The lens group or the polarizer, and the display screen are fastened to the body, and the light source and the compact camera module are fastened to the body or the temples.

In a possible implementation, the head-mounted display device further includes a second linear polaroid sheet and a third wave plate. The second linear polaroid sheet is disposed on an out-light side of the display screen, and the third wave plate is disposed between the second linear polaroid sheet and the hot mirror. In this application, the second linear polaroid sheet and the third wave plate are disposed between the display screen and the lens group, so that a part that is of a light ray that is emitted from the display screen and that is returned to the display screen after being reflected by the lens group can be intercepted. This reduces a ghost phenomenon of the head-mounted display device generated because of reflection of the light ray, and enables the user to view a clearer image.

According to a fifth aspect, this application provides a head-mounted display device. The head-mounted display device includes a light source, a lens group, a hot mirror, a display screen, and a compact camera module. The lens group includes a reflective polaroid sheet, a first wave plate, a lens, and a semi-reflective semi-transmissive film. The first wave plate is disposed on an in-light side of the lens, the semi-reflective semi-transmissive film is disposed on an out-light side of the lens, the reflective polaroid sheet is disposed on a side that is of the first wave plate and that faces away from the lens, the light source is disposed on a side that is of the reflective polaroid sheet and that faces away from the first wave plate, the display screen is disposed on a side that is of the semi-reflective semi-transmissive film and that faces away from the lens, the hot mirror is located between the display screen and the semi-reflective semi-transmissive film, and the compact camera module is disposed on a side that is of the polarizer and that faces away from the hot mirror. The light source is configured to emit a light ray to an eyeball of a user, the light ray is reflected by the eyeball to form a first light ray and a second light ray that are emitted to the polarizer. After being propagated between the polarizer and the hot mirror, the first light ray is emitted from a first area of the polarizer, and after being propagated between the polarizer and the hot mirror, the second light ray is emitted from a second area of the polarizer. A receive field of view of the compact camera module covers the first area and staggers the second area.

The compact camera module in this application is disposed on the side that is of the polarizer and that faces away from the hot mirror. Because of a characteristic of the polarizer, before being emitted from the polarizer, light rays (such as the first light ray and the second light ray) that enter the lens group from different directions need to be reflected twice by the hot mirror. In this way, a distance between a position at which the first light ray is emitted from the polarizer and a position at which the second light ray is emitted from the polarizer is large, so that the second light ray cannot enter the compact camera module even when the second light ray is emitted from the polarizer. Therefore, only a light ray of a predetermined path can enter the compact camera module, and a clean and clear image is formed by photographing by the compact camera module, so that light rays of a plurality of different paths are prevented from all entering the compact camera module and being photographed by the compact camera module, and a ghost image is not formed. This helps an eye-movement tracking apparatus perform an algorithm technology, improves eye-movement tracking precision, and further improves user experience.

In a possible implementation, the compact camera module includes an image sensor and a polaroid sheet located on an in-light side of the image sensor. The light ray reflected by the eyeball further forms a third light ray emitted to the polarizer, and the third light ray is reflected by the polarizer to the compact camera module. The polaroid sheet is configured to: allow the first light ray emitted from the first area to enter the image sensor, and prevent the third light ray reflected by the polarizer to the compact camera module from entering the image sensor. It may be understood that a polarization state and a propagation path of the third light ray are different from polarization states and propagation paths of the first light ray and the second light ray that are respectively emitted from the first area and the second area. In other words, in this embodiment, the polaroid sheet is disposed on the in-light side of the image sensor of the compact camera module, to prevent the third light ray that is reflected by the polarizer to the compact camera module from entering the image sensor, and reduce ghost images caused by light rays of other propagation paths.

In a possible implementation, a transmittance of the semi-reflective semi-transmissive film in a first band is greater than 95%, and a reflectivity is less than 1%, where the first band is a frequency band to which the light ray belongs. When the light ray emitted by the light source passes through the semi-reflective semi-transmissive film, most of the light ray can be emitted from the semi-reflective semi-transmissive film, and an extremely small part of the light ray is reflected. In this solution, light rays that are reflected by the semi-reflective semi-transmissive film and that finally enter the compact camera module can be effectively reduced, and formed ghost images are reduced. In addition, a loss of intensity of the first light ray can be reduced, so that intensity of the first light ray is large enough, intensity of the first light ray that is finally received by the compact camera module is ensured to be large enough, and the compact camera module can recognize the clear first light ray. This helps the eye-movement tracking apparatus perform the algorithm technology, improves eye-movement tracking precision, and further improves user experience.

In a possible implementation, an in-light side of the compact camera module faces the reflective polaroid sheet, and is configured to receive a light ray emitted from the polarizer. In this embodiment, an orientation of the compact camera module may be set by selecting the light ray of the predetermined path.

In a possible implementation, the eye-movement tracking apparatus further includes a reflector, and the reflector is configured to reflect the light ray to the in-light side of the compact camera module, so that the compact camera module is disposed more flexibly.

In a possible implementation, the head-mounted display device further includes a frame, where the frame includes a body and temples connected to the body. The lens group or the polarizer, and the display screen are fastened to the body, and the light source and the compact camera module are fastened to the body or the temples.

In a possible implementation, the head-mounted display device further includes a second linear polaroid sheet and a third wave plate. The second linear polaroid sheet is disposed on an out-light side of the display screen, and the third wave plate is disposed between the second linear polaroid sheet and the hot mirror. In this application, the second linear polaroid sheet and the third wave plate are disposed between the display screen and the lens group, so that a part that is of a light ray that is emitted from the display screen and that is returned to the display screen after being reflected by the lens group can be intercepted. This reduces a ghost phenomenon of the head-mounted display device generated because of reflection of the light ray, and enables the user to view a clearer image.

BRIEF DESCRIPTION OF THE DRAWINGS

To describe the technical solutions in embodiments of this application or in the background more clearly, the following describes the accompanying drawings for describing embodiments of this application or the background.

DETAILED DESCRIPTION OF ILLUSTRATIVE EMBODIMENTS

The following describes embodiments of this application with reference to the accompanying drawings in embodiments of this application.

In the descriptions of embodiments of this application, it should be noted that, unless otherwise precisely specified and limited, the terms "installation" and "connection" should be understood in a broad sense. For example, the "connection" may be a detachable connection or may be a non-detachable connection, or may be a direct connection or may be an indirect connection through an intermediate medium. A "fixed connection" means connecting each other and remaining a relative position relationship unchanged when connected. A "rotation connection" means connecting each other and being able to rotate relative to each other when connected. Orientation terms mentioned in embodiments of this application, for example, "below", "left", "right", "inside", and "outside", are merely directions with reference to the accompanying drawings. Therefore, the orientation terms are used to better and more clearly describe and understand embodiments of this application, instead of indicating or implying that a specified apparatus or an element needs to have a specific orientation, and needs to be constructed and operated in the specific orientation. Therefore, this cannot be understood as a limitation on embodiments of this application. "A plurality of" means at least two.

An embodiment of this application provides an electronic device, configured to be worn on a head of a user. The electronic device may be a head-mounted display device. For example, the electronic device may be an electronic product that combines digital content and a real scenario. The digital content is, for example, augmented reality (augmented reality, AR) glasses, an AR helmet, mixed reality (mixed reality, MR) glasses, or an MR helmet. Alternatively, the electronic device may not be worn on the head. In this application, an example in which the electronic device is AR glasses is used for specific description.

Figure 1:
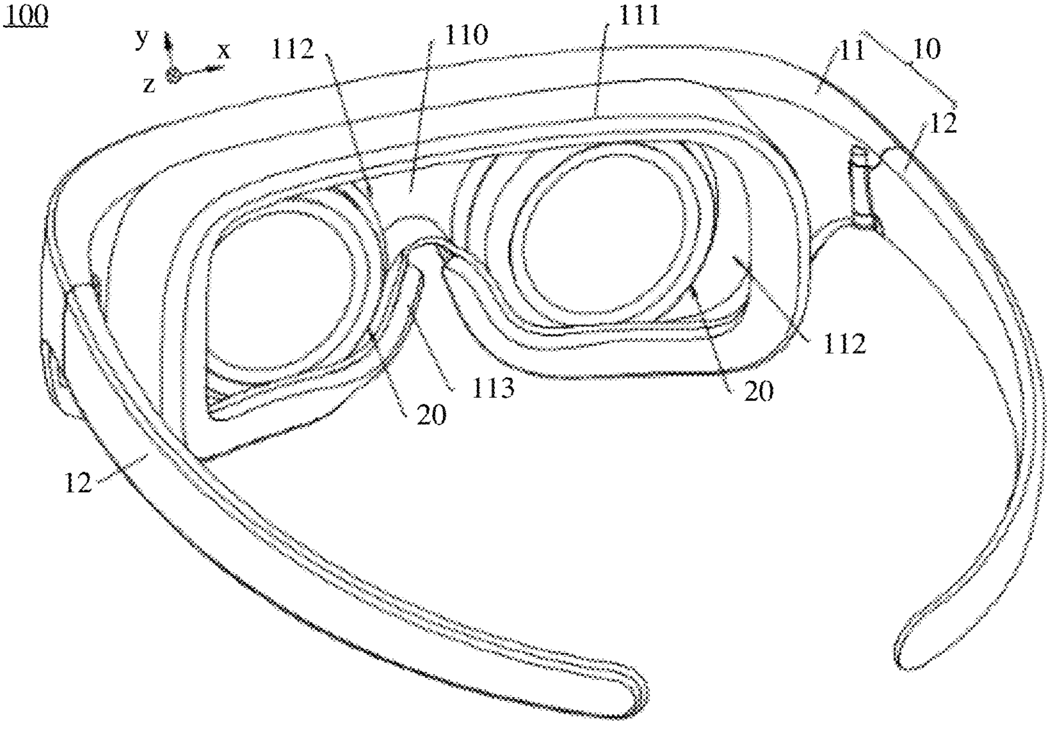
FIG. 1 is a schematic diagram of a structure of an electronic device according to an embodiment of this application.

FIG. 1 is a schematic diagram of a structure of an electronic device 100 according to an embodiment of this application.

In this embodiment, the electronic device 100 includes a frame 10 and augmented reality components 20 installed on the frame 10. There are two augmented reality components 20, and the two augmented reality components 20 are installed on the frame 10 at an interval.

The frame 10 includes a body 11 and temples 12 connected to the body 11. There are two temples 12, and the two temples 12 are connected to opposite ends of the body 11. It should be noted that, in another embodiment, the frame may alternatively include a body and a fixing belt connected to the body. This is not specifically limited in this application.

The body 11 may include a mounting surface no and an eye mask in. The eye mask 111 is disposed on the mounting surface no and forms accommodating cavities 112 with the mounting surface 110. In this embodiment, there are two accommodating cavities 112, and the two accommodating cavities 112 are respectively configured to accommodate electronic components of the electronic device 100. For example, a nose pad 113 is formed at a position that is on the eye mask in and that is between the two accommodating cavities 112, to facilitate wearing. The body 11 may be an integrated structure to ensure overall strength of the body 11. A material of the body 11 includes but is not limited to metal, plastic, resin, a natural material, or the like. It should be understood that the body 11 is not limited to the structure shown in FIG. 1, and may alternatively be a half-rim or rimless eyeglass frame as long as the body 11 can accommodate the electronic components of the electronic device 100.

The two temples 12 are rotatably connected to the opposite ends of the body 11. When the electronic device 100 is in an unfolded state (as shown in FIG. 1), the two temples 12 rotate relative to the body 11 to face each other. In this case, the two temples 12 of the electronic device 100 may be respectively placed on two ears of a user, and the nose pad 113 is placed on a nasal bridge of the user, so that the electronic device 100 is worn on a head of the user. When the user wears the device, two eyeballs of the user are respectively opposite to the accommodating cavities 112 corresponding to the two eyeballs, to facilitate viewing of images presented by the electronic components located in the accommodating cavities 112. When the electronic device 100 is in a folded state, the two temples 12 rotate relative to the body 11 until the two temples 12 at least partially overlap each other and are accommodated inside the body 11. In this case, the electronic device 100 can be accommodated.

For example, the eye mask 111 may have specific flexibility. When the user wears the electronic device 100, the eye mask 111 is in contact with skin of the user, to prevent external light from being transmitted through a gap between the skin of the user and the eye mask 111 and from affecting viewing experience of the user. At the same time, the eye mask 111 that is flexible can cushion gravity of the electronic device 100, and bring good wearing experience to the user. Certainly, in another embodiment, only a part of the eye mask 111 that is in contact with the user is flexible. Alternatively, the eye mask 111 may not be flexible.

It may be understood that, in another embodiment, the two temples 12 may be fixedly connected to the opposite ends of the body 11 respectively. Alternatively, the two temples 12 may be integrally formed with the body 11, that is, the electronic device 100 is always in the unfolded state. This is not specifically limited in this application. It should be noted that an accommodating cavity may alternatively be disposed inside the temple 12, and the accommodating cavity of the temple 12 may alternatively accommodate an electronic component of the electronic device 100.

It should be noted that, when the electronic device 100 is mentioned in this application, direction terms such as "inside" and "outside" are mainly described based on directions of the electronic device 100 when the electronic device 100 is worn by the user on the head. When the electronic device 100 is worn by the user, a side close to the head of the user is the inside, and a side away from the head of the user is the outside. This does not limit a direction of the electronic device 100 in another scenario.

Next, for ease of description, as shown in FIG. 1, a length direction of the electronic device 100 is defined as an x-axis direction, a width direction of the electronic device 100 is defined as a y-axis direction, a thickness direction of the electronic device 100 is defined as a z-axis direction, and the x-axis direction, the y-axis direction, and the z-axis direction are perpendicular to each other. The x-axis direction is a direction from one accommodating cavity 112 to the other accommodating cavity 112 in the accommodating cavities 112, and the z-axis direction is a direction from the body 11 to the temple 12.

In this embodiment, structures of the two augmented reality components 20 are the same. Specifically, the two augmented reality components 20 are respectively installed in the accommodating cavities 112 of the body 11 that correspond to the two augmented reality components 20. That is, the two augmented reality components 20 are disposed side by side in the x-axis direction. When the electronic device 100 is worn on the head of the user, one augmented reality component 20 corresponds to the left eye of the user, and the other augmented reality component 20 corresponds to the right eye of the user. In this case, both eyes of the user may view a virtual scenario and a real scenario by using the two augmented reality components 20. It should be noted that, in another embodiment, the structures of the two augmented reality components 20 may alternatively be different. This is not specifically limited in this application.

Figure 2:
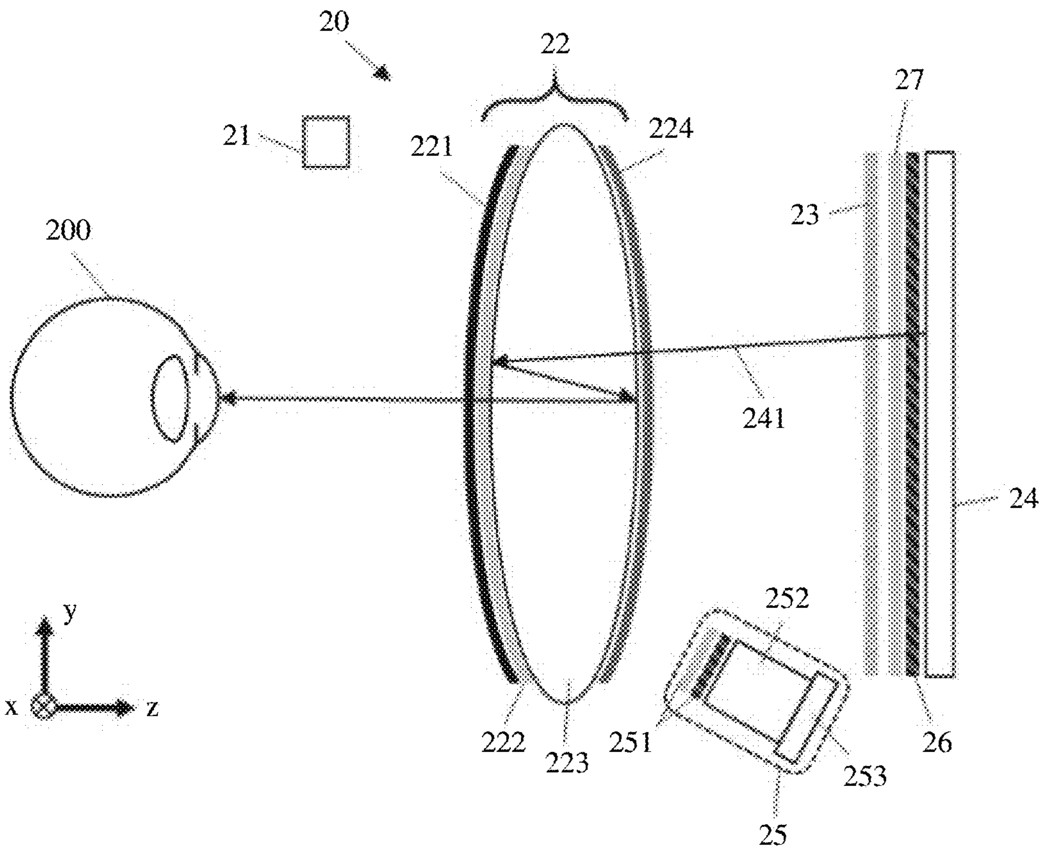
FIG. 2 is a schematic diagram of a structure of a first embodiment of an augmented reality component in the structure shown in FIG. 1.
Figure 3:
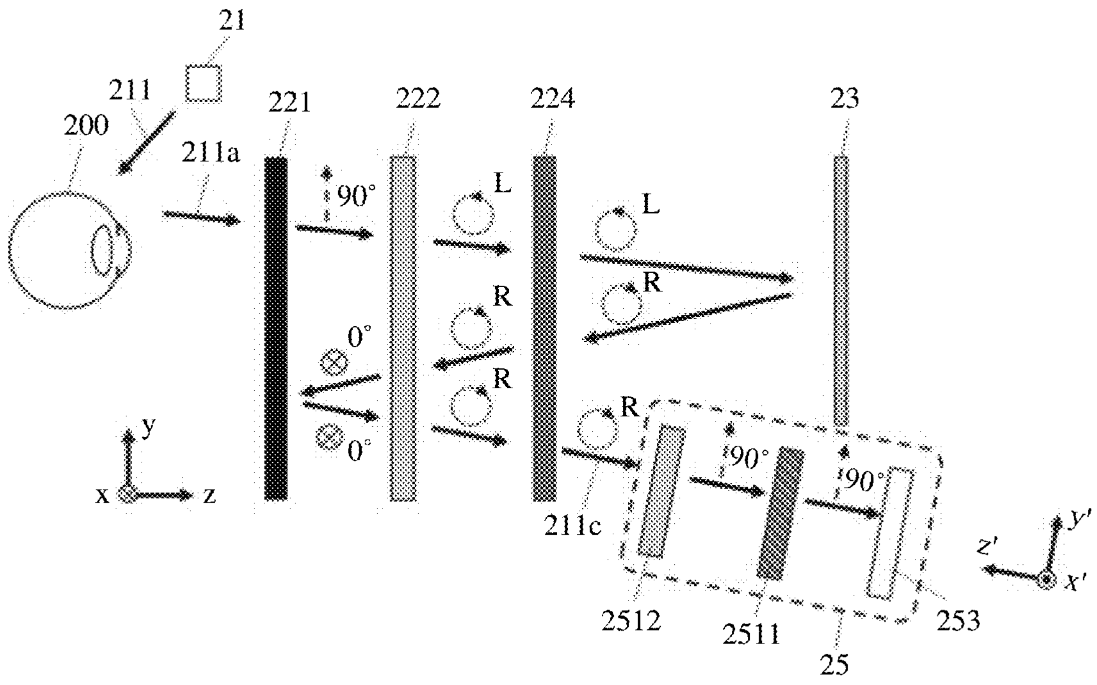
FIG. 3 is an optical path diagram of a light ray emitted by a light source in the structure shown in FIG. 2.
Figure 4:
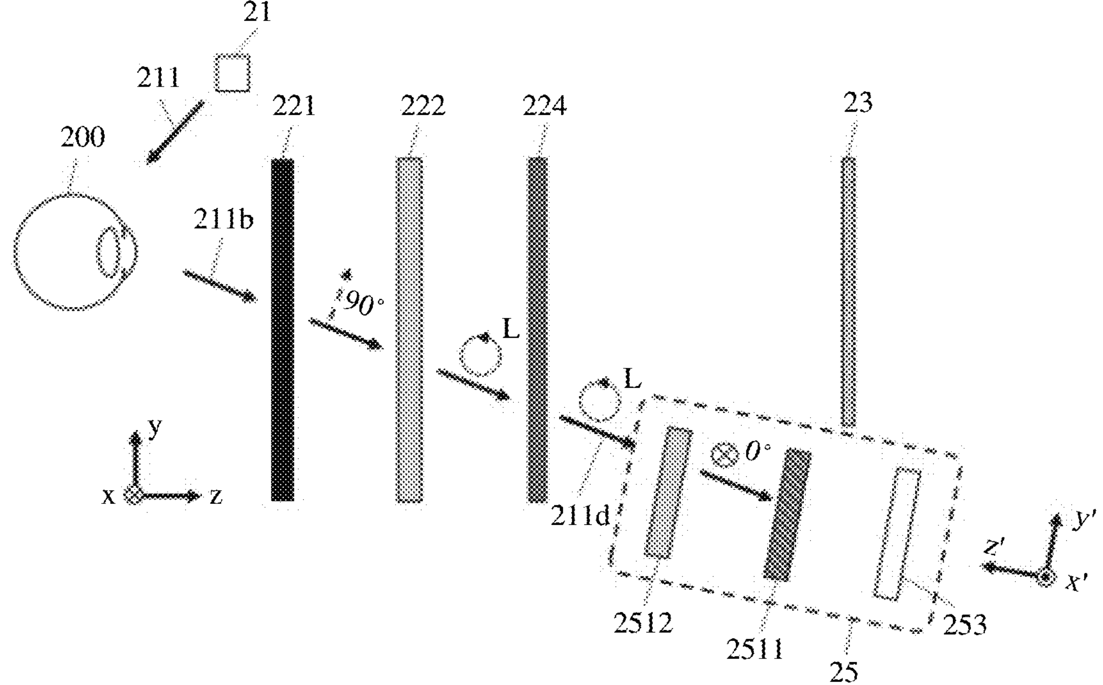
FIG. 4 is another optical path diagram of a light ray emitted by a light source in the structure shown in FIG. 2.

Next, for ease of understanding, the structure of the augmented reality component 20 is specifically described by using an example of the augmented reality component 20 corresponding to the right eye of the user. Refer to FIG. 2 to FIG. 4. FIG. 2 is a schematic diagram of a structure of a first embodiment of the augmented reality component 20 in the structure shown in FIG. 1. FIG. 3 is an optical path diagram of a light ray emitted by a light source in the structure shown in FIG. 2. FIG. 4 is another optical path diagram of the light ray emitted by the light source in the structure shown in FIG. 2.

The augmented reality component 20 includes a light source 21, a lens group 22, a hot mirror 23, a display screen 24, and a compact camera module 25. The light source 21, the lens group 22, the hot mirror 23, and the compact camera module 25 constitute an eye-movement tracking apparatus, and the lens group 22, the hot mirror 23, and the display screen 24 constitute a display apparatus. The display apparatus and the eye-movement tracking apparatus share the lens group 22 and the hot mirror 23. It may be understood that each of two augmented reality components 20 has a display screen, or the two augmented reality components 20 share a display screen.

The hot mirror 23 is disposed on an out-light side of the lens group 22. It may be understood that the out-light side of the lens group 22 is a side on which a light ray 211 of the light source 21 is emitted from the lens group 22, and the display screen 24 is disposed on a side that is of the hot mirror 23 and that faces away from the lens group 22, that is, the lens group 22, the hot mirror 23, and the display screen 24 are sequentially arranged at intervals in an optical-axis direction of the lens group 22. The compact camera module 25 includes an image sensor 253 and an optical component 251 located on an in-light side of the image sensor 253. The light source 21 is configured to emit the light ray 211 to an eyeball 200 of a user. The light ray 211 is reflected by the eyeball 200 to form a first light ray 211*a* and a second light ray 211*b* that are emitted to the lens group 22. The first light ray 211*a* is reflected by the hot mirror for N times to form a third light ray 211*c*, and the second light ray 211*b* is reflected by the hot mirror for M times to form a fourth light ray 211*d*. Both M and N are natural numbers, and M and N are different. The optical component 251 can allow the third light ray 211*c* to enter the image sensor 253, and prevent the fourth light ray 211*d* from entering the image sensor 253.

It may be understood that the augmented reality component 20 in this embodiment can be used to simulate a virtual environment by using the display apparatus. For example, a stereoscopic image may be displayed on the display screen 24 to simulate an illusion of depth, that is, a virtual environment is created, so that the user generates an illusion of being in the virtual environment. In addition, the augmented reality component 20 may estimate, by using the eye-movement tracking apparatus, which part of the virtual environment the user is viewing. In other words, while the display apparatus of the augmented reality component 20 can present the virtual environment to the user, the eye-movement tracking apparatus can detect a position at which eyes of the user gaze, namely, a specific position of the virtual environment at which the eyes of the user gaze, and better adjust, based on the position at which the eyes of the user gaze, the virtual environment presented to the user. This improves user experience.

As shown in FIG. 2, when the user wears the electronic device boo, the eyeball 200 of the user is located on a side that is of the lens group 22 and that faces away from the hot mirror 23. A light ray 241 of image information displayed on the display screen 24 sequentially passes through the hot mirror 23 and the lens group 22, is folded in the lens group 22, and is finally emitted to the eyeball 200 of the user, and the user receives the image information displayed on the display screen 24.

At the same time, the light source 21 emits the light ray 211, the light ray 211 is emitted to the eyeball 200 of the user, and is reflected by the eyeball 200 of the user to form the first light ray 211*a* and the second light ray 211*b* that are emitted to the lens group 22. The first light ray 211*a* is reflected by the hot mirror for N times to form the third light ray 211*c*, and the second light ray 211*b* is reflected by the hot mirror for M times to form the fourth light ray 211*d*. Both M and N are natural numbers, and M and N are different. It may be understood that propagation paths of the third light ray 211*c* and the fourth light ray 211*d* are different. Light rays of different paths all enter the compact camera module in a solution in a related technology. For example, a light ray may be reflected by the hot mirror for zero times, once, twice, or the like. For example, a light ray is reflected by the hot mirror for zero times. The light ray is directly transmitted through the lens group, and finally enters the compact camera module, that is, the light ray is not reflected by the hot mirror. Another light ray is reflected by the hot mirror once. The light ray is transmitted through the lens group, and after being reflected by the hot mirror, the light ray enters the lens group. Then the light ray enters the compact camera module after being reflected by the lens group. Propagation paths of light rays that are reflected for different times are different. Therefore, if the light rays all enter the compact camera module, because of different positions, light of different paths after being photographed by the compact camera module does not completely overlap after being superimposed, and forms a ghost image. An existence of the ghost image is not conducive to algorithm calculation performed by the eye-movement tracking apparatus, and reduces eye-movement tracking precision.

The optical component 251 is disposed on the in-light side of the image sensor 253 of the compact camera module 25 provided in this application. After the light ray 211 emitted by the light source 21 is reflected by the hot mirror 23 for different times, the third light ray 211*c* (FIG. 3) and the fourth light ray 211*d* (FIG. 4) of different propagation paths are formed. The optical component 251 can allow the third light ray 211C to enter the image sensor 253, and prevent the fourth light ray 211*d* from entering the image sensor 253. For example, in the embodiments shown in FIG. 3 and FIG. 4, the third light ray 211C is a light ray formed by reflecting the first light ray 211*a* once by the hot mirror 23, and the fourth light ray 211*d* is a light ray formed by reflecting the second light ray 211*b* zero times by the hot mirror 23. It may be understood that propagation paths of the third light ray 211*c* and the fourth light ray 211*d* are different, and polarization states of the third light ray 211*c* and the fourth light ray 211*d* are also different. In this application, the optical component 251 is disposed on an in-light side of the compact camera module 25, and the polarization states of the third light ray 211*c* and the fourth light ray 211*d* are selected, to allow a light ray (the light ray of the predetermined path is a light ray reflected by the hot mirror 23 for predetermined times, and the light ray of the predetermined path in this embodiment is the third light ray 211*c*) of a predetermined path to pass, and block a light ray (that is, a light ray of another path other than the third light ray 211*c*, for example, the fourth light ray 211*d*) of another path. Only the light ray of the predetermined path can enter the image sensor 253 of the compact camera module 25, and a clean and clear image is formed by photographing by the compact camera module 25, so that light rays of a plurality of different paths are prevented from all entering the image sensor 253 and being photographed by the compact camera module 25, and a ghost image is not formed. This helps the eye-movement tracking apparatus perform an algorithm technology, improves eye-movement tracking precision, and further improves user experience.

It may be understood that the third light ray 211*c* and the fourth light ray 211*d* are light rays formed by reflecting the first light ray 211*a* and the second light ray 211*b* respectively by the hot mirror 23 for times other than the foregoing exemplified times. In different implementation scenarios, the propagation paths of the third light ray 211*c* and the fourth light ray 211*d* may be changed by adjusting a factor such as a position of the compact camera module 25, as long as it is ensured that the light ray of the predetermined path enters the compact camera module 25.

In this embodiment, the light ray 211 emitted by the light source 21 is invisible light, for example, near-infrared light, that is, the light source 21 is a near-infrared light emitting diode, to prevent visible light from being emitted to the eyeball 200 of the user, which causes discomfort to the eyeball 200 of the user. This improves user experience. In addition, the light ray 211 emitted by the light source 21 is invisible light. Therefore, the light ray 211 does not affect light emitted by the display screen 24, and an eye-movement tracking technology is implemented while visual experience of the user is ensured. For example, the light source 21 is disposed on the side that is of the lens group 22 and that faces away from the hot mirror 23, so that the light ray 211 is emitted to the eyeball 200 of the user, to perform eye-movement tracking on the user. Specifically, the light source 21 may be fastened to the body 11 or the temple 12, or may be fastened to the body 11 or the temple 12 by using an intermediate connecting piece (FIG. 1).

In the embodiment shown in FIG. 2, only one light source 21 in the augmented reality component 20 is shown. Certainly, in another embodiment, there may be a plurality of light sources 21. When there are a plurality of light sources 21, in comparison with a solution in which there is one light source 21, light emitting intensity of a single light source 21 in the plurality of light sources 21 may be set weaker. This can reduce a risk that the eyeball 200 of the user is damaged due to excessively strong light ray irradiation. Alternatively, the light source 21 may be disposed at another position on the augmented reality component 20. A quantity of the light sources 21 and a disposing position of the light source 21 are not limited in this application.

In this embodiment, the lens group 22 is a pancake (pancake) lens group. The lens group 22 includes a reflective polaroid sheet 221, a first wave plate 222, a lens 223, and a semi-reflective semi-transmissive film 224 (Beam splitter, BS). The first wave plate 222 is disposed on an in-light side of the lens 223. It may be understood that the in-light side of the lens 223 is a side on which the light ray 211 of the light source 21 enters the lens 223. The reflective polaroid sheet 221 is disposed on a side that is of the first wave plate 222 and that faces away from the lens 223. The semi-reflective semi-transmissive film 224 is disposed on a side that is of the lens 223 and that faces away from the first wave plate 222, and is located between the lens 223 and the hot mirror 23. That is, on an optical axis of the lens 223, the reflective polaroid sheet 221, the first wave plate 222, the lens 223, and the semi-reflective semi-transmissive film 224 are disposed in sequence. An optical axis of the lens group 22 and the optical axis of the lens 223 are coaxial. For example, there is one lens 223. Certainly, there may alternatively be a plurality of lenses 223, and quantities of reflective polaroid sheets 221, first wave plates 222, and semi-reflective semi-transmissive films 224 may be not limited to one. The lens group 22 may be directly fastened to the body 11 (FIG. 1) of the frame 10, or may be indirectly fastened to the body 11 of the frame 10. In another embodiment, the lens group 22 may alternatively be another type of lens group other than the pancake lens group.

In this embodiment, the first wave plate 222 is adhesive to a surface that is of the lens 223 and that is located on the in-light side, the semi-reflective semi-transmissive film 224 is adhesive to a surface that is of the lens 223 and that faces away from the first wave plate 222, and the reflective polaroid sheet 221 is adhesive to a surface that is of the first wave plate 222 and that faces away from the lens 223. In other words, the reflective polaroid sheet 221, the first wave plate 222, and the semi-reflective semi-transmissive film 224 are all directly or indirectly adhesive and fastened to the lens 223, and the lens 223 is fastened to the body 11. This avoids using another support to fasten the reflective polaroid sheet 221, the first wave plate 222, and the semi-reflective semi-transmissive film 224, and facilitates miniaturization of the lens group 22. That is, the reflective polaroid sheet 221, the first wave plate 222, and the semi-reflective semi-transmissive film 224 may be understood as a multi-layer film structure in the pancake lens group, to fold the light ray 241 between film layers. Certainly, in another embodiment, the first wave plate 222, the reflective polaroid sheet 221, and the semi-reflective semi-transmissive film 224 may alternatively be fastened to the body 11 by using another fastening structure.

For example, the reflective polaroid sheet 221 is a reflective polarizing film (Reflective Polarizer, RP), and the first wave plate 222 is a quarter-wave plate (Quarter-wave plate, QWP). A function of the reflective polaroid sheet is to transmit polarized light whose polarization direction is perpendicular to an x-axis direction, and reflect polarized light whose polarization direction is parallel to the x-axis direction. That is, the reflective polaroid sheet 221 may reflect polarized light that is in the x-axis direction, and transmit polarized light that is in the y-axis direction. In other words, a polarization direction of the reflective polaroid sheet 221 is along the y-axis direction. The quarter-wave plate is a birefringent monocrystalline wave plate having specific thickness. A fast-axis direction of the first wave plate 222 and the y-axis form an angle of 45°.

In this embodiment, a transmittance of the semi-reflective semi-transmissive film 224 in a first band is greater than 95%, and a reflectivity is less than 1%. The first band is a frequency band to which the light ray 211 emitted by the light source 21 belongs, that is, a frequency band of the first band is 850 nm±20 nm. In other words, when the light ray 211 emitted by the light source 21 passes through the semi-reflective semi-transmissive film 224, most of the light ray 211 can be emitted from the semi-reflective semi-transmissive film 224, and an extremely small part of the light ray 211 is reflected. In this solution, light rays (that is, the fourth light ray, it may be understood that the fourth light ray is not limited to the light ray 211*d* of the path shown in FIG. 4, and all light rays having a path different from that of the third light ray 211*c* are the fourth light ray) that are reflected by the semi-reflective semi-transmissive film 224 and that finally enter the compact camera module 25 can be effectively reduced, and formed ghost images are reduced. In addition, a loss of intensity of the first light ray 211*a* can be reduced, so that intensity of the third light ray 211*c* formed by reflecting by the hot mirror 23 is large enough, intensity of the third light ray 211*c* that is finally received by the compact camera module 25 is ensured to be large enough, and the compact camera module 25 can recognize the clear third light ray 211*c*. This helps the eye-movement tracking apparatus perform the algorithm technology, improves eye-movement tracking precision, and further improves user experience.

The semi-reflective semi-transmissive film 224 is semi-reflective and semi-transmissive in a second band, that is, a transmittance of the semi-reflective semi-transmissive film 224 in the second band is 50%, and a reflectivity is 50%. The second band is a band in which visible light (or the light ray 241 emitted by the display screen 24) is located, that is, a band of the second band is 400 nm to 720 nm. Therefore, half of the light ray 241 from the display screen 24 is reflected through the semi-reflective semi-transmissive film 224, so that the light ray 241 is folded in the lens group 22. This lengthens an optical path of the light ray 241 but does not increase thickness of the augmented reality component 20, and facilitates miniaturization of the augmented reality component 20.

Figure 5:
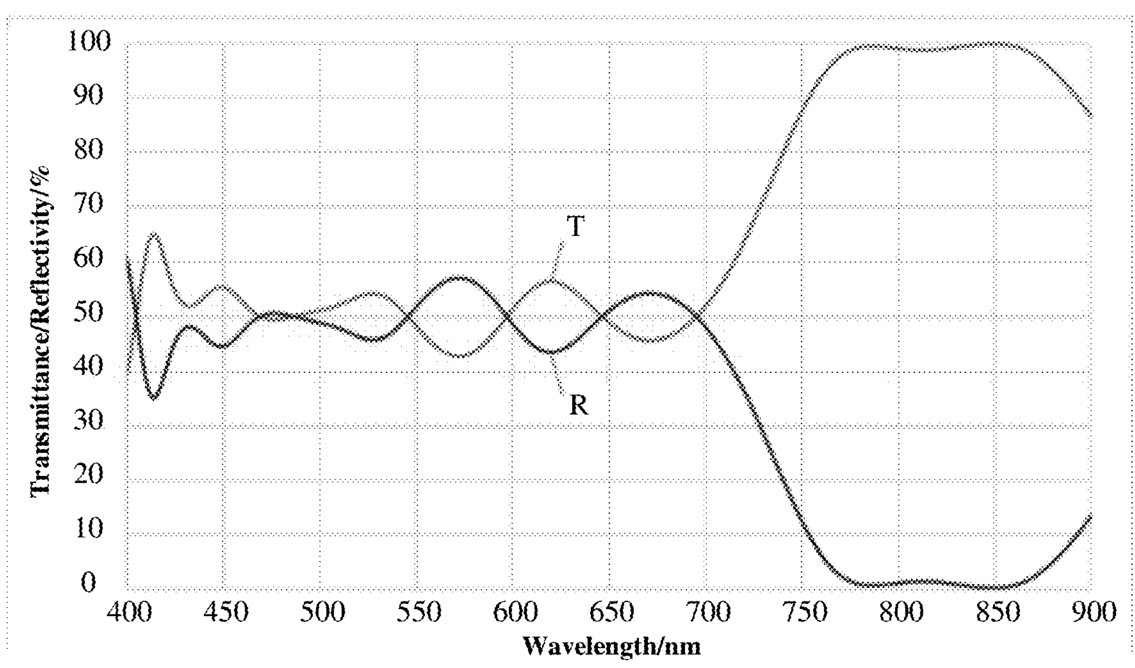
FIG. 5 is a schematic diagram of a transmission and reflection spectrum curve of a semi-reflective semi-transmissive film in the structure shown in FIG. 2 from a visible light band to a near-infrared band.

FIG. 5 is a schematic diagram of a transmission and reflection spectrum curve of the semi-reflective semi-transmissive film 224 in the structure shown in FIG. 2 from a visible light band to a near-infrared band. For example, the semi-reflective semi-transmissive film 224 that is semi-reflective and semi-transmissive in a visible light range and that is high-transmissive in a near-infrared range may generally be formed by stacking a plurality of layers of films having different refractive indexes. By selecting a refractive index of a material having a specific high or low refractive index, thickness of each film layer is designed, to implement semi-reflection and semi-transmission in a visible light band, especially in a band range of 400 nm to 700 nm. For example, a semi-reflective semi-transmissive film whose transmittance is greater than or equal to 40% in the band range of 40 nm to 700 nm, and whose transmittance is greater than or equal to 80% in the near-infrared range, especially in a band of 850 nm, may be formed on a substrate by staggered stacking of a high-refractive-index material and a low-reflectivity material. The substrate may be glass, for example, K9 glass, the high-refractive-index material may be titanium dioxide, and the low-reflectivity material may be silicon dioxide. There may be seven layers of either high-refractive-index materials or low-reflectivity materials, and obtained film system deposition parameters are shown in Table 1. The transmission and reflection spectrum curve of the semi-reflective semi-transmissive film from the visible light band to the near-infrared band is shown in FIG. 5, where T represents a transmittance, and R represents a reflectivity. It should be noted that many semi-reflective semi-transmissive film designs can achieve the foregoing effect of semi-transmission and semi-reflection in the visible light band and high-transmission in the near-infrared band. This is only a design result of a specific semi-reflective semi-transmissive film, and a protection range of the semi-reflective semi-transmissive film is not limited.

TABLE 1

| Film system deposition parameter | | |
|---|---|---|
| Film layer | Material | Thickness/nm |
| 1 | $SIO_2$ | 106.66 |
| 2 | $TIO_2$ | 14.07 |
| 3 | $SIO_2$ | 33.78 |
| 4 | $TIO_2$ | 90.53 |
| 5 | $SIO_2$ | 10 |
| 6 | $TIO_2$ | 42.33 |
| 7 | $SIO_2$ | 11.27 |
| 8 | $TIO_2$ | 262.37 |

TABLE 1-continued

| Film system deposition parameter | | |
|---|---|---|
| Film layer | Material | Thickness/nm |
| 9 | $SIO_2$ | 12.66 |
| 10 | $TIO_2$ | 121.5 |
| 11 | $SIO_2$ | 168.21 |
| 12 | $TIO_2$ | 73.35 |
| 13 | $SIO_2$ | 44.39 |
| 14 | $TIO_2$ | 60.58 |

As shown in FIG. 3 and FIG. 4, in this embodiment, the hot mirror 23 is a special film that has a high reflectivity (for example, a reflectivity >95%) in the first band (850 nm±20 nm), and that has a high transmittance (for example, a transmittance >95%) in the second band (400 nm to 720 nm). Therefore, the light ray 241 emitted from the display screen 24 may be transmitted through the hot mirror 23 to a great extent, and the light ray 211 emitted from a light source 21 may be reflected by the hot mirror 23. That is, the hot mirror 23 has little impact on the light ray 241 emitted from the display screen 24, and does not affect viewing by the user of image information displayed on the display screen 24. In addition, the light ray 211 emitted by the light source 21 is further enabled to finally enter the image sensor 253 of the compact camera module 25, to implement eye-movement tracking. For example, the hot mirror 23 may be fastened to the body 11, or may be fastened to a display surface of the display screen 24. The hot mirror 23 and the display surface of the display screen 24 are disposed in parallel. This facilitates miniaturization of the electronic device boo in thickness. Certainly, in another embodiment, the hot mirror 23 may alternatively be disposed at an included angle with the display surface of the display screen 24.

As shown in FIG. 2 and FIG. 3, the compact camera module 25 is a near-infrared compact camera module, that is, the compact camera module 25 can photograph near-infrared light. The compact camera module 25 may include a camera lens 252 and the image sensor 253 that senses the light ray 211. The optical component 251 is disposed on an in-light side of the camera lens 251. In this embodiment, the image sensor 253 is a photosensitive chip. The compact camera module 25 is disposed between the lens group 22 and the hot mirror 23, and is fastened to the body 11. That is, the compact camera module 25 is fastened between the hot mirror 23 and the lens group 22 by using the body 11. The compact camera module 25 may be directly fastened to the body 11, or may be indirectly fastened to the body 11. Certainly, in another embodiment, the compact camera module 25 may be alternatively fastened to the temple 12.

Specifically, the in-light side of the compact camera module 25 faces the lens group 22, and is configured to receive a light ray emitted by a lens subgroup 23. An optical axis of the compact camera module 25 is inclined relative to an optical axis of the lens group 22. The third light ray **211*c* that is formed by reflecting the first light ray 211*a* twice between the reflective polaroid sheet 221 and the hot mirror 23 enters the image sensor 253. Therefore, a tilt angle of the optical axis of the compact camera module 25 relative to the optical axis of the lens group 22 is smaller. This is more convenient for the compact camera module 25 to photograph the third light ray 211*c*, reduces a phase difference and distortion of the compact camera module 25**, and improves eye-movement tracking precision.

Figure 6:
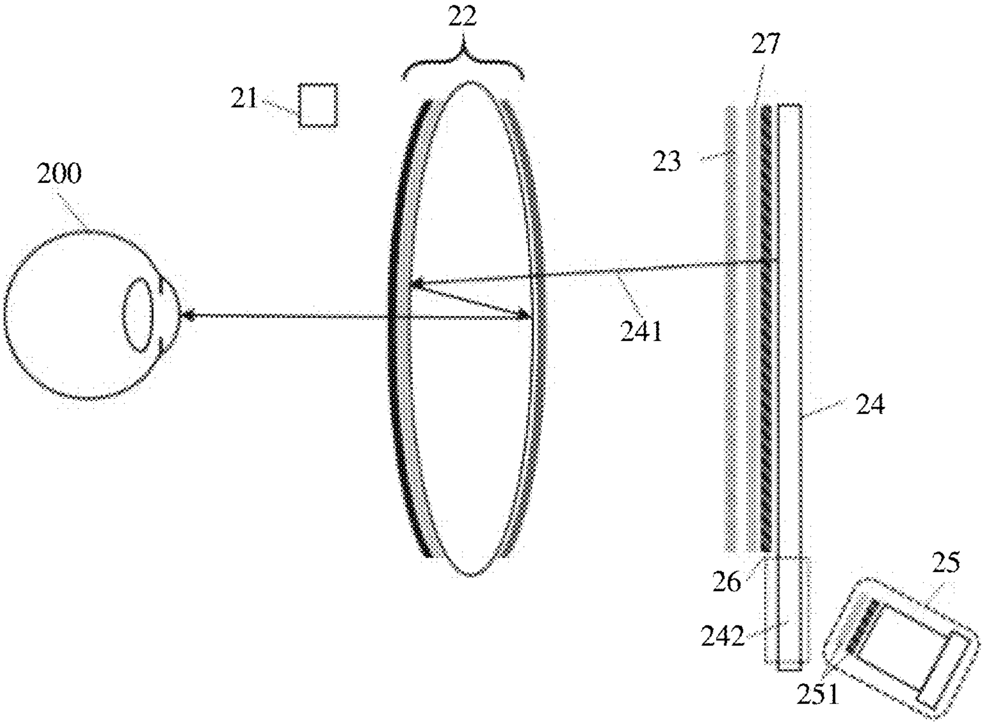
FIG. 6 is a schematic diagram of a structure of another implementation form of the structure shown in FIG. 2.
Figures 7, 8:
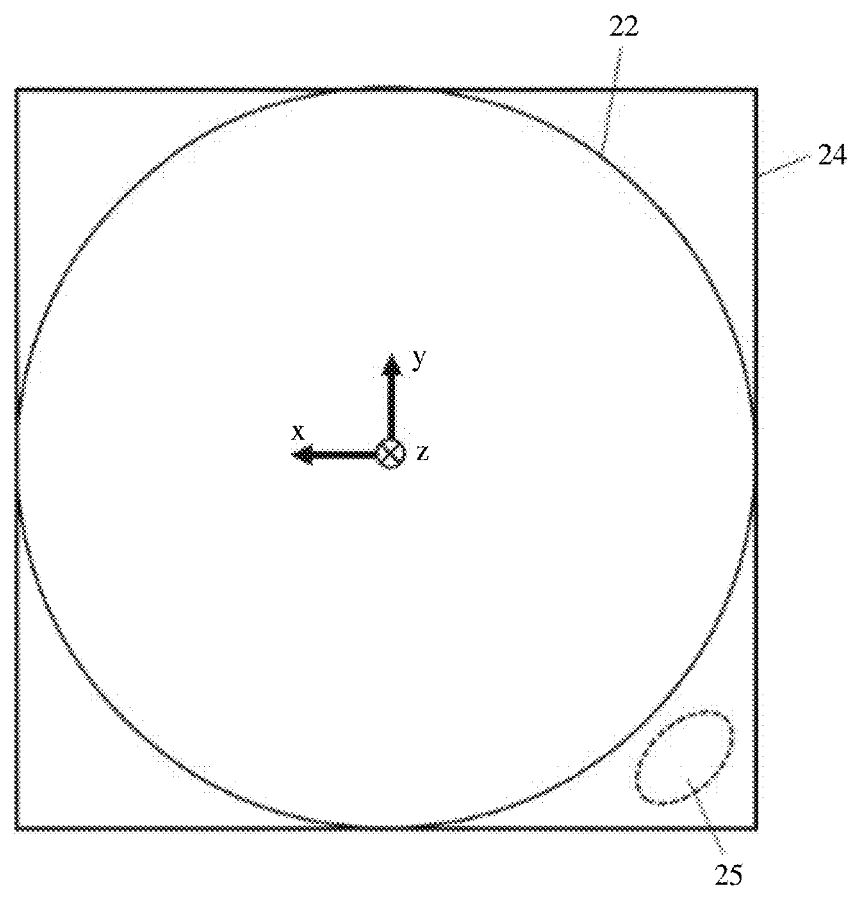
FIG. 7 is a schematic diagram of a structure of a partial structure of the structure shown in FIG. 6 from another perspective.
FIG. 8 is a schematic diagram of a path of a light ray in the structure shown in FIG. 2.

Certainly, in another embodiment, refer to FIG. 6 and FIG. 7. FIG. 6 is a schematic diagram of a structure of another implementation form of the structure shown in FIG. 2, and FIG. 7 is a schematic diagram of a structure of a partial structure of the structure shown in FIG. 6 from another perspective. The display screen 24 includes a light-passing area 242, and the compact camera module 25 is disposed on a side that is of the display screen 24 and that faces away from the hot mirror 23, that is, the compact camera module 25 is disposed below the display screen 24. It may be understood that below the display screen 24 is a side that is of the display screen 24 and that faces away from the display surface of the display screen 24. In addition, the in-light side of the compact camera module 25 is disposed directly opposite to the light-passing area 242. When the compact camera module 25 is disposed below the display screen 24, the in-light side of the compact camera module 25 can receive the third light ray 211*c* that is from the lens group 22 and that is transmitted through the light-passing area 242. In this embodiment, in comparison with disposing the compact camera module 25 at another position such as between the lens group 22 and the hot mirror 23, no space for installing the compact camera module 25 needs to be reserved between the lens group 22 and the hot mirror 23. This facilitates miniaturization of the electronic device boo. Certainly, in another implementation scenario, the display screen may further include a through via, the compact camera module is embedded in the through via, and the in-light side of the compact camera module faces the lens group.

Specifically, as shown in FIG. 7, the compact camera module 25 may be disposed in an edge area of the display screen 24, for example, four corner areas of the display screen 24, to ensure that the compact camera module 25 does not affect an image displayed on the display screen 24. For example, when the user wears the electronic device 100, the compact camera module 25 may be disposed in a lower right corner of the display screen 24 that corresponds to the left eye of the user and in a lower left corner of the display screen 24 that corresponds to the right eye of the user. The setting manner is more convenient for the compact camera module 25 to photograph the third light ray 211*c*, achieves a better photographing effect, and effectively improves eye-movement tracking precision.

As shown in FIG. 2 and FIG. 3, the optical component 251 includes a first linear polaroid sheet 2511 and a second wave plate 2512. The first linear polaroid sheet 2511 is disposed on the in-light side of the compact camera module 25, and the second wave plate 2512 is disposed on a side that is of the first linear polaroid sheet 2511 and that faces away from the compact camera module 25. That is, the first linear polaroid sheet is located between the compact camera module 25 and the second wave plate 2512. In this embodiment, a polarization direction of the reflective polaroid sheet 221 is the same as that of the first linear polaroid sheet 2511. The first linear polaroid sheet 2511 is a polarizing film. The second wave plate 2512 is a quarter-wave plate. For example, the first linear polaroid sheet 2511 may be fastened, by bonding, to a surface on which an in-light side of the camera lens 252 of the compact camera module 25 is located, and the second wave plate 2512 may be fastened, by bonding, to a surface that is of the first linear polaroid sheet 2511 and that faces away from the compact camera module 25.

Certainly, in another implementation scenario, the first linear polaroid sheet 2511 and the second wave plate 2512 may alternatively be fastened to the in-light side of the compact camera module 25 by using a clasp. Alternatively, the first linear polaroid sheet 2511 and the second wave plate 2512 may be screwed and fastened to the compact camera module 25 by using a middleware. Alternatively, the first linear polaroid sheet 2511 and the second wave plate 2512 may be fastened to the body 11 of the frame 10.

Certainly, in an implementation scenario of another embodiment, when the polarization direction of the reflective polaroid sheet is perpendicular to that of the first linear polaroid sheet, the optical component can allow the fourth light ray to enter the image sensor 253, and prevent the third light ray from entering the image sensor 253. In another implementation scenario of another embodiment, the optical component includes a first circular polaroid sheet. A rotation direction of the first circular polaroid sheet is the same as that of the first wave plate, and a polarization direction of the first circular polaroid sheet is the same as or perpendicular to that of the reflective polaroid sheet. That is, the first circular polaroid sheet can replace the first linear polaroid sheet and the second wave plate.

For ease of description, as shown in FIG. 3, an optical-axis direction of the compact camera module 25 is defined as a z' axis, an opposite direction of the x axis is defined as an x' axis, and a direction perpendicular to the optical-axis direction of the compact camera module is defined as a y' axis. An x'-axis direction, a y'-axis direction, and a z'-axis direction are perpendicular to each other. An optical axis of the first linear polaroid sheet 2511 is along the y'-axis direction, and an included angle between a fast-axis direction of the second wave plate 2512 and the polarization direction of the first linear polaroid sheet 2511 is 45°, that is, the fast-axis direction of the second wave plate 2512 and the x' axis form an angle of 45°.

To clearly describe a process in which the compact camera module 25 photographs the eyeball 200 of the user, FIG. 3 shows polarization states when the first light ray 211*a* reflected by the eyeball 200 passes through different elements in a process of reaching the image sensor 253 of the compact camera module 25. The light ray 211 emitted from the light source 21 is natural light. The natural light includes polarized light that vibrates in various directions. The first light ray 211*a* that is formed by reflecting the natural light by the eyeball 200 of the user is still natural light After passing through the reflective polaroid sheet 221, the first light ray 211*a* is modulated into linearly polarized light whose polarization direction is perpendicular to the x axis. The fast-axis direction of the first wave plate 222 and the x axis form an angle of 45°, and after the first light ray 211*a* passes through the first wave plate 222, a polarization state of the first light ray 211*a* is modulated into left-handed polarized light. The semi-reflective semi-transmissive film 224 does not change the polarization state of the first light ray 211*a*. Therefore, the first light ray 211*a* is still left-handed polarized light after passing through the semi-reflective semi-transmissive film 224, becomes right-handed polarized light after being reflected by the hot mirror 23, and is still right-handed polarized light after passing through the semi-reflective semi-transmissive film 224 again. As described above, the semi-reflective semi-transmissive film 224 in this embodiment is high-transmissive and low-reflective in the first band (near-infrared light 850 nm±20 nm). Therefore, for the first light ray 211*a*, the semi-reflective semi-transmissive film 224 is equivalent to a parallel flat plate, and stray light or a ghost image caused by reflection of a surface of the semi-reflective semi-transmissive film 224 is slight. After being modulated by the first wave plate 222, right-handed polarized light passing through the semi-reflective semi-transmissive film 224 becomes linearly polarized light whose polarization direction is parallel to the x-axis. As described above, the reflective polaroid sheet 221 reflects the linearly polarized light whose polarization direction is parallel to the x-axis. Therefore, the first light ray 211*a* is reflected, and passes through the first wave plate 222 and the semi-reflective semi-transmissive film 224 again to form the third light ray 211*c*. The light ray 211 is modulated by the first wave plate 222 into right-handed polarized light, and the semi-reflective semi-transmissive film 224 does not affect a polarization state of the light ray 211. Therefore, the third light ray 211C is right-handed polarized light. After being modulated by the second wave plate 2512, the third light ray 211*c* becomes linearly polarized light whose polarization direction is 90° to the x' axis. A light transmission axis of the first linear polaroid sheet 2511 is along the y'-axis direction. Therefore, the linearly polarized light passes through the first linear polaroid sheet 2511 and is focused on the image sensor 253 by using the camera lens 252 of the compact camera module 25, that is, the compact camera module 25 photographs the light ray 211 reflected by the eyeball 200 of the user, to form an image.

At the same time, as shown in FIG. 4, in this embodiment, a light ray that directly passes through the lens group 22 can be effectively eliminated. This greatly reduces ghost image brightness. In this embodiment, the light ray 211 emitted from the light source 21 is natural light, and forms the second light ray 211*b* after being reflected by the eyeball 200 of the user. The second light ray 211*b* is still natural light. After passing through the reflective polaroid sheet 221, the second light ray 211*b* is modulated into linearly polarized light whose polarization direction is perpendicular to the x axis. The fast-axis direction of the first wave plate 222 and the x axis forms an angle of 45°, and after the second light ray 211*b* passes through the first wave plate 222, a polarization state of the second light ray 211*b* is modulated into left-handed polarized light. The semi-reflective semi-transmissive film 224 does not change the polarization state of the second light ray 211*b*. Therefore, the second light ray 211*b* is still left-handed polarized light after passing through the semi-reflective semi-transmissive film 224, and the left-handed polarized light forms the fourth light ray 211*d*. Then, the fourth light ray 211*d* passes through the second wave plate 2512, and is modulated by the second wave plate 2512 into linearly polarized light whose polarization direction is along the x'-axis direction. The polarization direction is perpendicular to a direction of the light transmission axis of the first linear polaroid sheet 2511. Therefore, the fourth light ray 211*d* is absorbed by the first linear polaroid sheet 2511. That is, the fourth light ray 211*d* that directly passes through the lens group 22 is absorbed by the first linear polaroid sheet 2511, is not irradiated to the image sensor 253 of the compact camera module 25, and cannot be superimposed with an image formed by the third light ray 211C. This can effectively eliminate a ghost image and improve precision of an eye-movement tracking algorithm.

It can be learned from FIG. 3 that the first light ray 211*a* reflected by the eyeball 200 is folded twice between the reflective polaroid sheet 221 and the hot mirror 23. Therefore, in comparison with photographing the eyeball 200 of the user directly through the lens group 22, the compact camera module 25 may photograph the eyeball 200 of the user at a smaller tilt angle. In conclusion, in this embodiment, on the premise of ensuring that the near-infrared compact camera module 25 photographs the eyeball 200 of the user at a small tilt angle, the optical component 251 is disposed, and a polarization selection manner is used. This greatly reduces ghost images formed by light rays directly passing through the lens group 22.

As shown in FIG. 2, the augmented reality component 20 further includes a second linear polaroid sheet 26 and a third wave plate 27. The second linear polaroid sheet 26 is disposed on an out-light side of the display screen 24, and the third wave plate 27 is disposed between the second linear polaroid sheet 26 and the hot mirror 23. In this embodiment, the second linear polaroid sheet 26 is a polarizing film, and the third wave plate 27 is a quarter-wave plate. The second linear polaroid sheet 26 may be fastened, by bonding, to the display surface of the display screen 24, and the third wave plate 27 may be fastened, by bonding, to a surface that is of the second linear polaroid sheet 26 and that faces away from the display screen 24.

Certainly, in another embodiment, the second linear polaroid sheet 26 and the third wave plate 27 may alternatively be sequentially fastened, by using a middleware, to a side facing the display surface of the display screen 24. Alternatively, the augmented reality component 20 further includes a second circular polaroid sheet. The second circular polaroid sheet is disposed between the hot mirror and the display screen. In other words, the second circular polaroid sheet may replace the second linear polaroid sheet and the third wave plate.

To clearly describe a process in which the user views an image displayed on the display screen 24, refer to FIG. 8. FIG. 8 is a schematic diagram of a path of a light ray in the structure shown in FIG. 2. FIG. 8 shows polarization states when the light ray 241 emitted by the display screen 24 passes through different elements in a process of reaching the eyeball 200 of the user. As shown in FIG. 8, the light ray 241 from the display screen 24 is folded in the lens group 22, and is finally emitted to the eyeball 200 of the user.

Specifically, the light ray 241 emitted from the display screen 24 first passes through the second linear polaroid sheet 26 and then is modulated into linearly polarized light. Without loss of generality, a polarization direction may be set to be along the y-axis direction. After passing through the third wave plate 27, the light ray 241 becomes right-handed polarized light. A fast-axis direction of the third wave plate 27 and the y axis form an angle of 45°, and the right-handed polarized light is transmitted through the hot mirror 23. Then, the light ray 241 reaches the semi-reflective semi-transmissive film 224, a part of the light ray 241 is reflected, and the other part of the light ray 241 is transmitted, passes through the first wave plate 222, and reaches the reflective polaroid sheet 221. The fast-axis direction of the first wave plate 222 is the same as that of the third wave plate 27. In this case, the light ray 241 is re-modulated into linearly polarized light, and a polarization direction is along the x-axis direction. The reflective polaroid sheet 221 may reflect polarized light that is in the x-axis direction, and transmit polarized light that is in the y-axis direction. Therefore, the light ray 241 is reflected and reaches the semi-reflective semi-transmissive film 224 through the first wave plate 222. In this case, the light ray 241 is right-handed polarized light. As described above, a part of the light ray 241 is transmitted and the other part of the light ray 241 is reflected. A polarization state of the light ray 241 changes to left-handed polarized light. After passing through the first wave plate 222, the light ray 241 is modulated into linearly polarized light again, and the polarization direction is along the y-axis direction. According to a characteristic of the reflective polaroid sheet 221, the light ray 241 is emitted through the reflective polaroid sheet 221, and finally enters a human eye. It can be learned from the foregoing path descriptions of the light ray 241 that the light ray 241 emitted by the display screen 24 is folded in the lens group 22, and finally enters the human eye. Folding, by using the lens group 22, the light ray 241 emitted by the display screen 24 lengthen an optical path of the light ray 241 but does not increase thickness of the augmented reality component 20. This facilitates miniaturization of the augmented reality component 20.

At the same time, when the light ray 241 reaches the semi-reflective semi-transmissive film 224, a part of the light ray 241 is transmitted and finally enters the human eye, the other part of the light ray 241 is reflected by the semi-reflective semi-transmissive film 224 and forms left-handed polarized light, and the other part of the light ray 241 passes through the third wave plate 27 to form linearly polarized light. The polarization direction is along the x-axis direction. According to a characteristic of the second linear polaroid sheet 26, the light ray 241 (a part of an optical path represented by dashed arrows in FIG. 8) is intercepted by the second linear polaroid sheet 26.

In this application, the second linear polaroid sheet 26 and the third wave plate 27 are disposed between the display screen 24 and the lens group 22, so that a part that is of the light ray 241 emitted from the display screen 24 and that returns to the display screen 24 after being reflected by the lens group 22 can be intercepted. This reduces a ghost phenomenon in the augmented reality component 20 generated because of reflection of a light ray, and enables the user to view a clearer image.

The electronic device 100 may further include a processor. The processor is disposed in the body 11. The processor is electrically connected to the display screen 24 and the compact camera module 25, and is configured to control content displayed on the display screen 24 and perform eye-movement tracking calculation on the user based on information photographed by the compact camera module 25. The processor may include one or more processing units. A plurality of processing units may be, for example, an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors. It should be understood that the processor may be a central processing unit (central processing unit, CPU) of the electronic device 100, or may be another processor of the electronic device 100.

Figure 9:
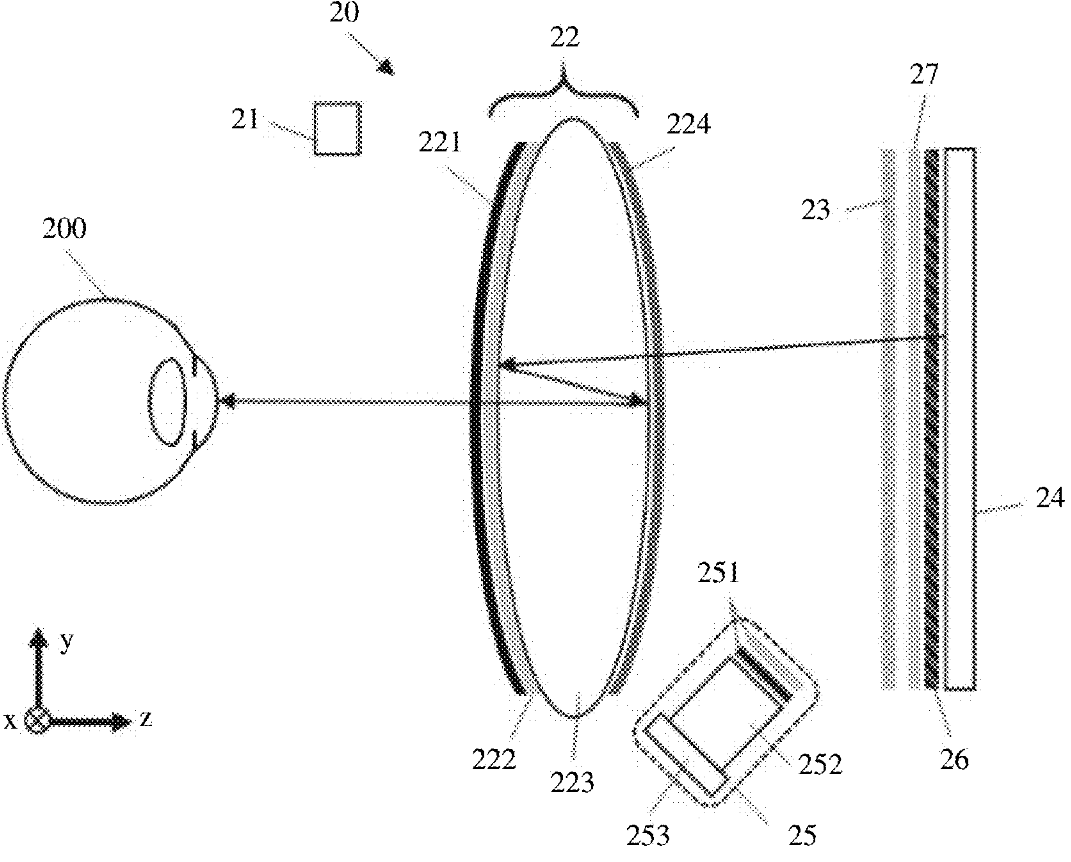
FIG. 9 is a schematic diagram of a structure of a second embodiment of an augmented reality component in the structure shown in FIG. 1.
Figure 10:
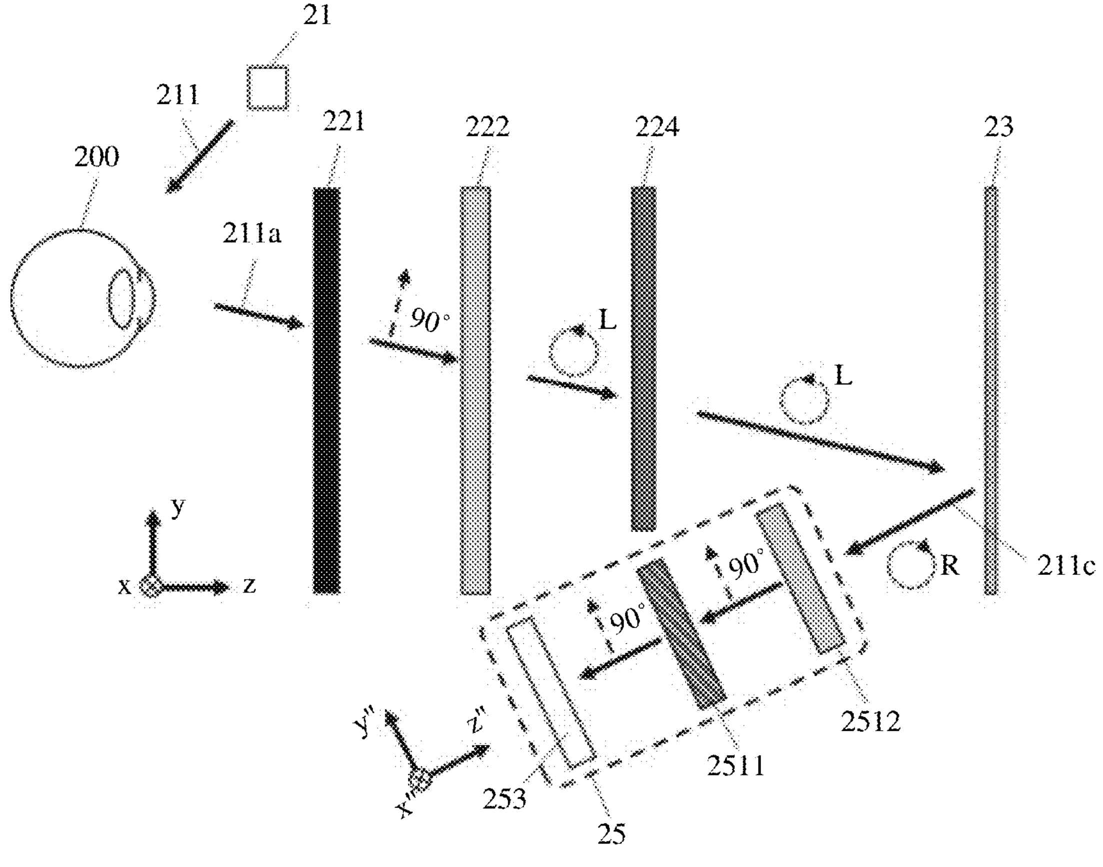
FIG. 10 is an optical path diagram of a light ray emitted by a light source in the structure shown in FIG. 9.
Figure 11:
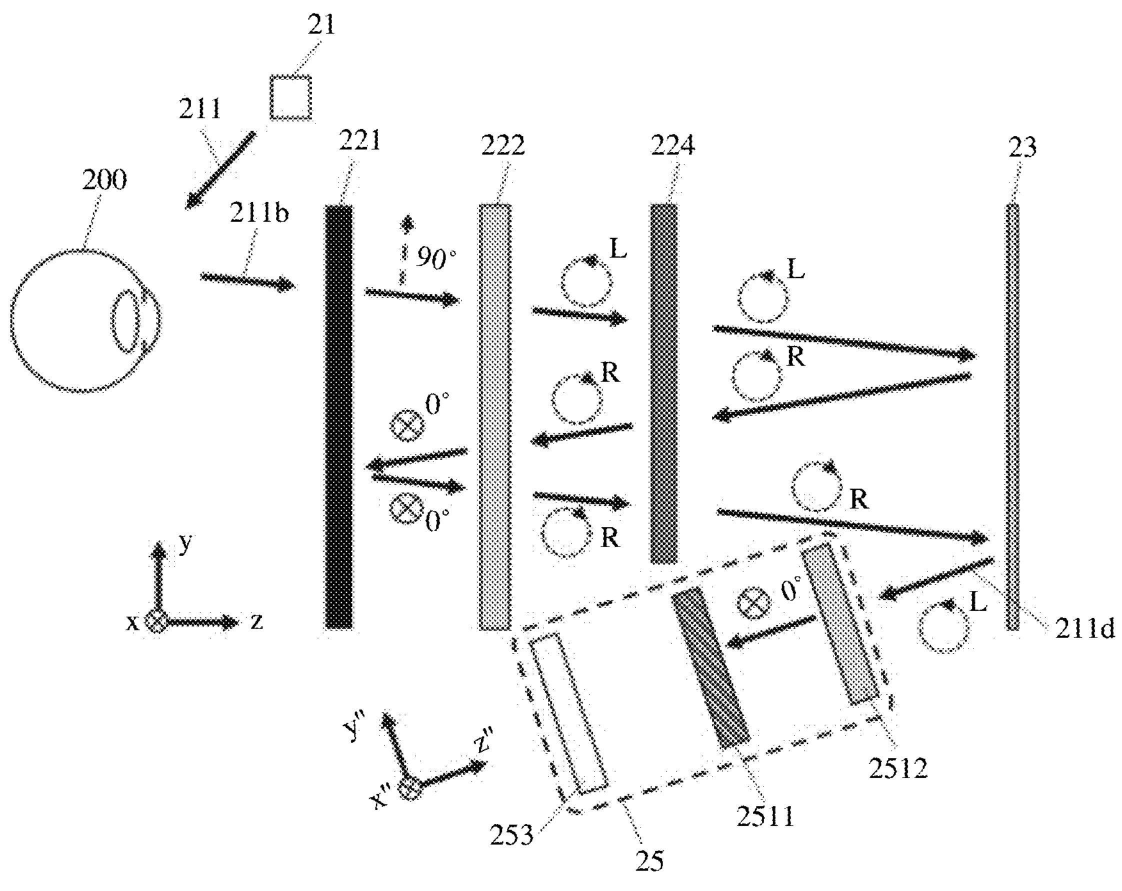
FIG. 11 is another optical path diagram of a light ray emitted by a light source in the structure shown in FIG. 9.

FIG. 9 is a schematic diagram of a structure of a second embodiment of the augmented reality component 20 in the structure shown in FIG. 1. FIG. 10 is an optical path diagram of a light ray 211 emitted by a light source 21 in the structure shown in FIG. 9. FIG. 11 is another optical path diagram of the light ray 211 emitted by the light source 21 in the structure shown in FIG. 9. This embodiment is roughly the same as the first embodiment. A difference lies in that a compact camera module 25 in this embodiment is disposed between a lens group 22 and a hot mirror 23, an in-light side of the compact camera module 25 faces the hot mirror 23, and is configured to receive a light ray reflected by the hot mirror 23. An optical axis of the compact camera module 25 is inclined relative to an optical axis of the lens group 22. A third light ray 211*c* that is formed by reflecting a light ray of the light source 21 once between a reflective polaroid sheet 221 and the hot mirror 23 enters an image sensor 253. Therefore, a tilt angle of the optical axis of the compact camera module 25 relative to the optical axis of the lens group 22 is small. This is convenient for the compact camera module 25 to photograph the third light ray 211*c*, reduces a phase difference and distortion of the compact camera module 25, and improves eye-movement tracking precision.

For ease of description, as shown in FIG. 10, an optical-axis direction of the compact camera module 25 is used as a z" axis, and an x-axis direction is used as an x" axis, to establish a local coordinate system x" y" z". A direction perpendicular to the optical-axis direction of the compact camera module 25 is defined as a y" axis, and an x"-axis direction, a y"-axis direction, and a z"-axis direction are perpendicular to each other. A light transmission axis of a first linear polaroid sheet 2511 is along the y"-axis direction, and an included angle between a fast-axis direction of a second wave plate 2512 and a polarization direction of the first linear polaroid sheet 2511 is 45°, that is, the fast-axis direction of the second wave plate 2512 and the x" axis form an angle of 45°.

To clearly describe a process in which the compact camera module 25 photographs an eyeball 200 of a user, FIG. 10 shows polarization states when a first light ray 211*a* reflected by the eyeball 200 passes through different elements in a process of reaching the image sensor 253 of the compact camera module 25. Specifically, the light ray 211 emitted from the light source 21 is natural light, and forms the first light ray 211*a* after being reflected by the eyeball 200 of the user. The first light ray 211*a* is still natural light. After passing through the reflective polaroid sheet 221, the first light ray 211*a* is modulated into linearly polarized light whose polarization direction is perpendicular to the x axis. A fast-axis direction of a first wave plate 222 and the x axis form an angle of 45°, and after the first light ray 211*a* passes through the first wave plate 222, a polarization state of the first light ray 211*a* is modulated into left-handed polarized light. A semi-reflective semi-transmissive film 224 does not change the polarization state of the first light ray 211*a*. Therefore, the first light ray 211*a* is still left-handed polarized light after passing through the semi-reflective semi-transmissive film 224, and becomes right-handed polarized light after being reflected by the hot mirror 23. As described above, the semi-reflective semi-transmissive film 224 in this embodiment is high-transmissive and low-reflective in a first band (near-infrared light 850 nm±20 nm). Therefore, for the first light ray 211*a*, the semi-reflective semi-transmissive film 224 is equivalent to a parallel flat plate, and stray light or a ghost image caused by reflection of a surface of the semi-reflective semi-transmissive film 224 is slight. Right-handed polarized light reflected from the hot mirror 23 is the third light ray 211*c*, and the third light ray 211C is modulated by the second wave plate 2512 into linearly polarized light whose polarization direction is 90° to the x" axis. Therefore, the linearly polarized light can be transmitted through the first linear polaroid sheet 2511, and is focused on the image sensor 253 by using a camera lens 252 of the compact camera module 25, that is, the compact camera module 25 photographs the third light ray 211*c* reflected by the eyeball 200 of the user, to form an image.

At the same time, as shown in FIG. 11, in this embodiment, a light ray reflected by the hot mirror 23 twice can be effectively eliminated. This greatly reduces ghost image brightness. In this embodiment, the light ray 211 emitted from the light source 21 is natural light, and forms a second light ray 211*b* after being reflected by the eyeball 200 of the user. The second light ray 211*b* is still natural light. After passing through the reflective polaroid sheet 221, the second light ray 211*b* is modulated into linearly polarized light whose polarization direction is perpendicular to the x axis.

The fast-axis direction of the first wave plate 222 and the x axis form an angle of 45°, and after the second light ray 211*b* passes through the first wave plate 222, a polarization state of the second light ray 211*b* is modulated into left-handed polarized light. The semi-reflective semi-transmissive film 224 does not change a polarization state of the light ray 211. Therefore, the second light ray 211*b* is still left-handed polarized light after passing through the semi-reflective semi-transmissive film 224, and becomes right-handed polarized light after being reflected by the hot mirror 23. The right-handed polarized light is linearly polarized through the first wave plate 222, and a polarization direction is along the x-axis direction. The right-handed polarized light is reflected by the reflective polaroid sheet 221, and is still linearly polarized light whose polarization direction is unchanged. After passing through the first wave plate 222, the linearly polarized light forms right-handed polarized light, and after transmitted through the semi-reflective semi-transmissive film 224, the linearly polarized light is still right-handed polarized light. The right-handed polarized light is reflected by the hot mirror 23 to form left-handed polarized light, to form a fourth light ray 211*d*. The fourth light ray 211*d* passes through the second wave plate 2512 to form linearly polarized light whose polarization direction is along the x"-axis direction. The linearly polarized light is absorbed by the first linear polaroid sheet 2511, is not irradiated to the image sensor 253 of the compact camera module 25, and cannot be superimposed with an image formed by the third light ray 211*c*. This can effectively eliminate a ghost image and improve precision of an eye-movement tracking algorithm.

It can be learned from FIG. 10 that a light ray reflected by the eyeball 200 is folded once between the reflective polaroid sheet 221 and the hot mirror 23. Therefore, in comparison with photographing the eyeball 200 of the user directly through the lens group 22, the compact camera module 25 may photograph the eyeball 200 of the user at a smaller tilt angle. In conclusion, in this embodiment, on the premise of ensuring that the near-infrared compact camera module 25 photographs the eyeball 200 of the user at a small tilt angle, an optical component 251 is disposed, and a polarization selection manner is used. This greatly reduces ghost images formed by the compact camera module 25.

Figure 12:
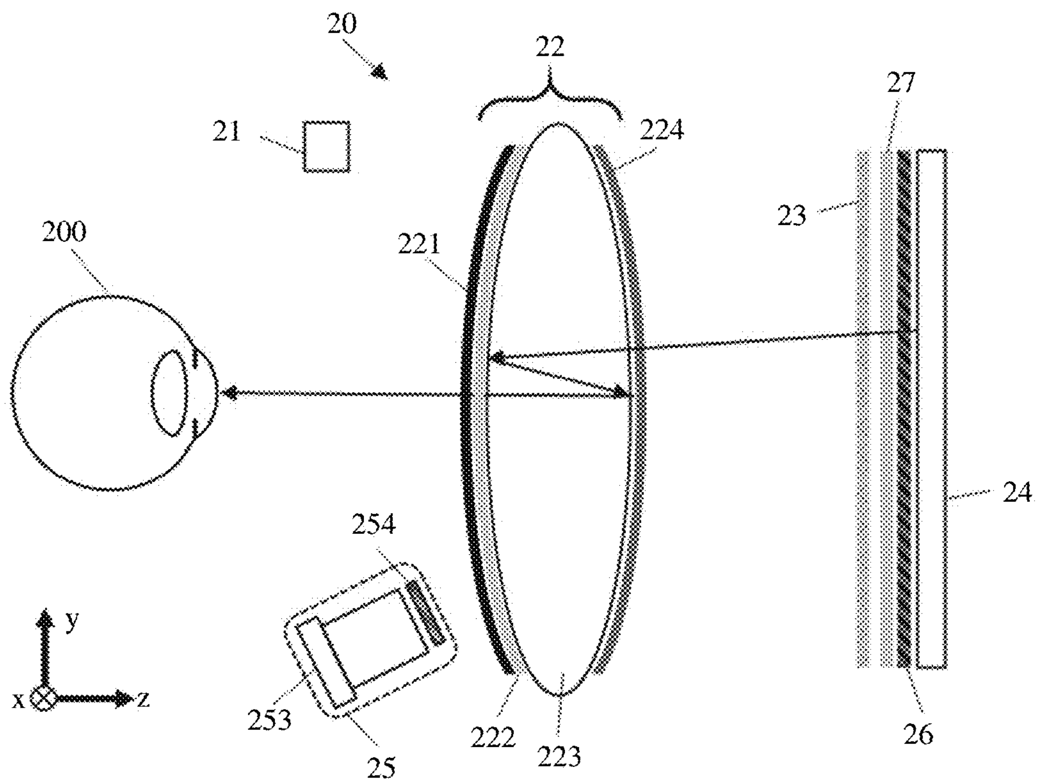
FIG. 12 is a schematic diagram of a structure of a third embodiment of an augmented reality component in the structure shown in FIG. 1.
Figure 13:
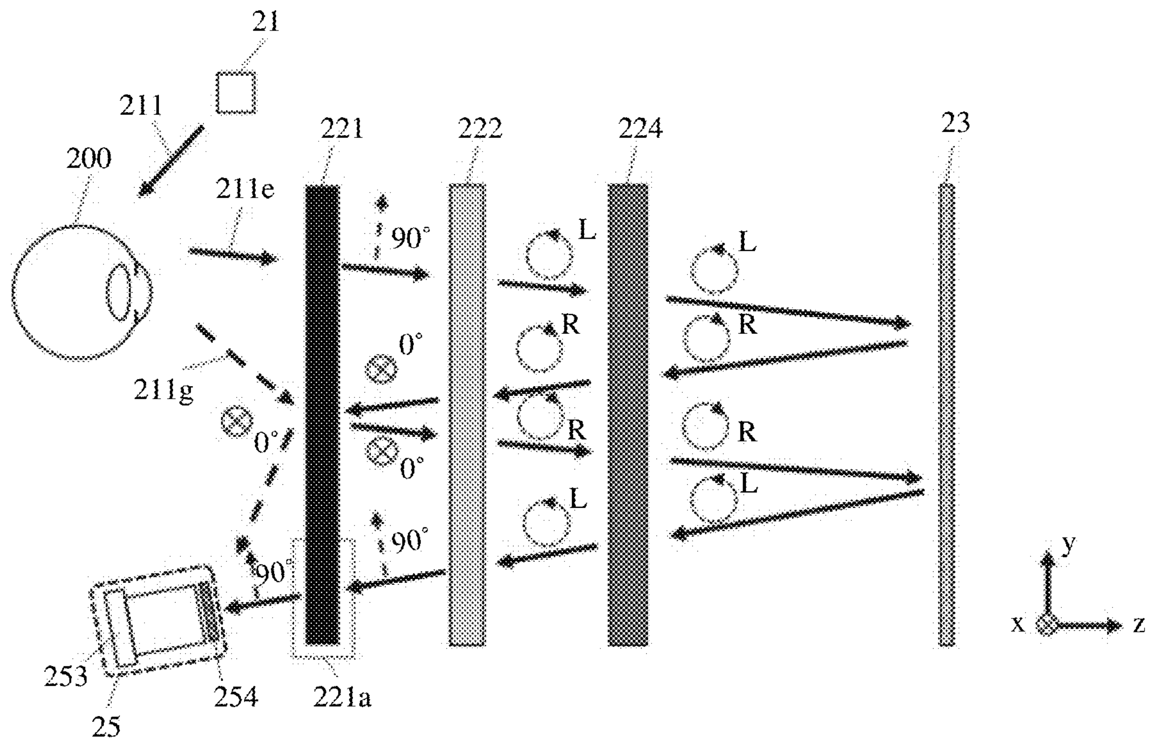
FIG. 13 is an optical path diagram of a light ray emitted by a light source in the structure shown in FIG. 12.
Figure 14:
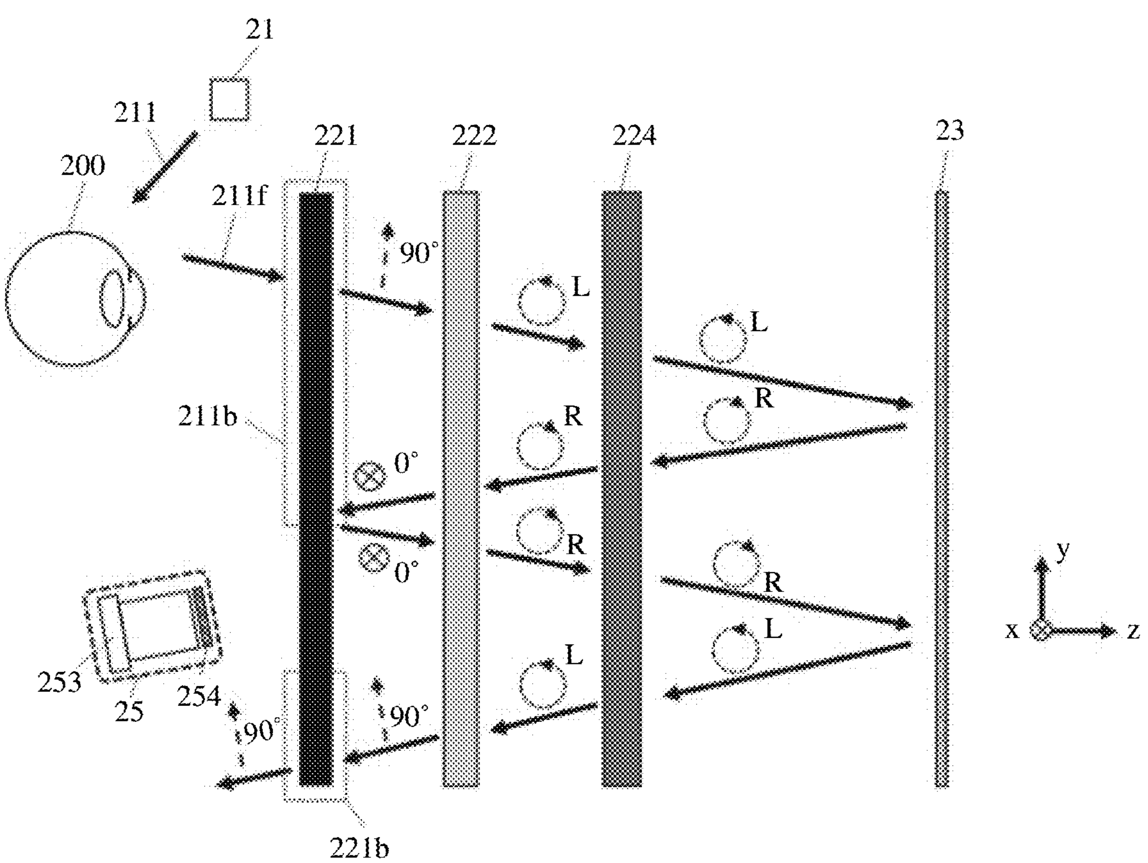
FIG. 14 is another optical path diagram of a light ray emitted by a light source in the structure shown in FIG. 12.

FIG. 12 is a schematic diagram of a structure of a third embodiment of the augmented reality component 20 in the structure shown in FIG. 1. FIG. 13 is an optical path diagram of a light ray emitted by a light source 21 in the structure shown in FIG. 12. FIG. 14 is another optical path diagram of a light ray emitted by the light source 21 in the structure shown in FIG. 12.

This embodiment is roughly the same as the second embodiment. A difference lies in that, in this embodiment, the augmented reality component 20 includes a light source 21, a lens group 22, a hot mirror 23, a display screen 24, and a compact camera module 25. The lens group 22 includes a reflective polaroid sheet 221, a first wave plate 222, a lens 223, and a semi-reflective semi-transmissive film 224. The reflective polaroid sheet 221 and the first wave plate 222 form a polarizer. In an optical-axis direction of the lens group 22, the reflective polaroid sheet 221, the first wave plate 222, the lens 223, the semi-reflective semi-transmissive film 224, the hot mirror 23, and the display screen 24 are disposed in sequence. The compact camera module 25 is disposed on a side that is of the reflective polaroid sheet 221 and that faces away from the first wave plate 222. In other words, the compact camera module 25 in this embodiment is disposed on a near-eye side. The light source 21 can emit a light ray 211 to an eyeball 200 of a user, and the light ray 211 is reflected by the eyeball 200 to form a first light ray 211*e* and a second light ray 211*f* that are emitted to the polarizer. After being propagated between the reflective polaroid sheet 221 of the polarizer and the hot mirror 23, the first light ray 211*e* is emitted from a first area 221*a* of the polarizer. After being propagated between the reflective polaroid sheet 221 of the polarizer and the hot mirror 23, the second light ray 211*f* is emitted from a second area 221*b* of the polarizer. A receive field of view of the compact camera module 25 covers the first area 221*a* and staggers the second area 221*b*. That is, the compact camera module 25 can receive the first light ray 211*e*, but cannot receive the second light ray 211*f*. The first area 221*a* of the polarizer is a first area 221*a* of the reflective polaroid sheet 221, the second area 221*b* of the polarizer is a second area 221*b* of the reflective polaroid sheet 221, and the second area 221*b* is an entire area of the reflective polaroid sheet 221 other than the first area 221*a*.

The compact camera module 25 is a near-infrared compact camera module, that is, the compact camera module 25 can photograph near-infrared light. The compact camera module 25 may include a camera lens 252 and an image sensor 253 that senses the light ray 211. The compact camera module 25 may be directly fastened to the temple 12, or may be indirectly fastened to the temple 12. Certainly, in another embodiment, the compact camera module 25 may be alternatively fastened to the body 11. In this embodiment, a specific structure and related parameter of the light source 21, the lens group 22, the hot mirror 23, and the display screen 24 are all the same as those in the first embodiment, and details are not described herein again.

When the user wears an electronic device, the eyeball 200 of the user is located on a side that is of the lens group 22 and that faces away from the hot mirror 23. A light ray 241 of image information displayed on the display screen 24 sequentially passes through the hot mirror 23 and the lens group 22, is folded in the lens group 22, and is finally emitted to the eyeball 200 of the user, and the user receives the image information displayed on the display screen 24. At the same time, the light source 21 emits the light ray 211. The light ray 211 is emitted to the eyeball 200 of the user, is reflected to the lens group 22 through the eyeball 200 of the user, and sequentially passes through the reflective polaroid sheet 221, the first wave plate 222, and the semi-reflective semi-transmissive film 224 to reach the hot mirror 23. Between the reflective polaroid sheet 221 and the hot mirror 23, the light ray 211 forms the first light ray 211*e* and the second light ray 211*f* that have a plurality of different propagation paths. The compact camera module 25 can receive the first light ray 211*e*, but cannot receive the second light ray 211*f*.

In this application, the compact camera module 25 is disposed on the side that is of the lens group 22 and that faces away from the hot mirror 23. In other words, one of the first light ray 211*e* and the second light ray 211*f* that are formed by being reflected between the reflective polaroid sheet 221 and the hot mirror 23 and that have a plurality of different propagation paths is finally emitted to the compact camera module 25 by using the reflective polaroid sheet 221.

It may be understood that, as shown in FIG. 13, the light ray 211 is reflected by the eyeball 200 to form the first light ray 211*e*, and the first light ray 211*e* sequentially passes through the reflective polaroid sheet 221, the first wave plate 222, and the semi-reflective semi-transmissive film 224 to reach the hot mirror 23. After being reflected by the hot mirror 23 and sequentially passing through the semi-reflective semi-transmissive film 224 and the first wave plate 222, because of a characteristic of the reflective polaroid sheet 221, the first light ray 211*e* is reflected by the reflective polaroid sheet 221 to the hot mirror 23. In other words, after being reflected by the hot mirror once, the first light ray 211*e* is reflected by the reflective polaroid sheet 221 to the hot mirror 23, and after being reflected again by the hot mirror 23 and passing through the semi-reflective semi-transmissive film 224 and the first wave plate 222 again, because of the characteristic of the reflective polaroid sheet 221, the first light ray 211*e* is emitted from the reflective polaroid sheet 221. That is, only the first light ray 211*e* that is reflected twice by the hot mirror 23 can be emitted from the first area 221*a* of the reflective polaroid sheet 221, enter the compact camera module 25, and be sensed by the compact camera module 25. In other words, in this application, by changing a disposing position of the compact camera module 25, the reflective polaroid sheet 221 and the first wave plate 222 that are in the lens group 22 are cleverly used to select a polarization state of a light ray that enters the compact camera module 25. It may alternatively be understood as that a light ray of a predetermined path may be selected, by using the reflective polaroid sheet 221 and the first wave plate 222, to enter the compact camera module 25, and the light ray of the predetermined path is a light ray that is reflected twice by the hot mirror 23.

As shown in FIG. 13 and FIG. 14, because of characteristics of the reflective polaroid sheet 221 and the first wave plate 222, before being emitted from the reflective polaroid sheet 221, light rays (for example, the first light ray 211*e* and the second light ray 211*f*) that enter the lens group 22 from different directions need to be reflected twice (that is, reflected three times between the reflective polaroid sheet 221 and the hot mirror 23) by the hot mirror 23. In this way, a distance between positions at which the first light ray 211*e* and the second light ray 211*f* are emitted from the reflective polaroid sheet 221 is large, so that the second light ray 211*f* cannot enter the compact camera module 25 even when the second light ray 211*f* is emitted from the reflective polaroid sheet 221. Therefore, only the light ray of the predetermined path can enter the compact camera module 25, and a clean and clear image is formed by photographing by the compact camera module 25, so that light rays of a plurality of different paths are prevented from all entering the compact camera module 25 and being photographed by the compact camera module 25, and a ghost image is not formed. This helps an eye-movement tracking apparatus perform an algorithm technology, improves eye-movement tracking precision, and further improves user experience.

At the same time, in this embodiment, a ghost image problem is solved by using a component that already exists in the lens group 22. This avoids introduction of a new component (the optical components 251 in the first embodiment and the second embodiment), facilitates miniaturization of the electronic device, and reduces costs of the electronic device.

Specifically, an in-light side of the compact camera module 25 faces the reflective polaroid sheet 221, and is configured to receive a light ray emitted from the polarizer. An optical axis of the compact camera module 25 is inclined relative to an optical axis of the lens group 22. The first light ray 211*e* that is formed by reflecting the light ray 211 of the light source 21 three times between the reflective polaroid sheet 221 and the hot mirror 23 enters the compact camera module 25. Therefore, a tilt angle of the optical axis of the compact camera module 25 relative to the optical axis of the lens group 22 is smaller than those in the first embodiment and the second embodiment. This is convenient for the compact camera module 25 to photograph the first light ray 211*e*, reduces a phase difference and distortion of the compact camera module 25, and improves eye-movement tracking precision.

To clearly describe a process in which the compact camera module 25 photographs the eyeball 200 of the user, FIG. 13 shows polarization states when the light ray 211 reflected by the eyeball 200 passes through different elements in a process of reaching the image sensor 253 of the compact camera module 25. The light ray 211 emitted from the light source 21 is natural light. The natural light includes polarized light that vibrates in various directions. The first light ray 211*e* that is formed by reflecting the natural light by the eyeball 200 of the user is still natural light. After passing through the reflective polaroid sheet 221, the first light ray 211*e* is modulated into linearly polarized light whose polarization direction is perpendicular to an x axis. A fast-axis direction of the first wave plate 222 and the x axis form an angle of 45°, and after the first light ray 211*e* passes through the first wave plate 222, a polarization state of the first light ray 211*e* is modulated into left-handed polarized light. The semi-reflective semi-transmissive film 224 does not change the polarization state of the first light ray 211*e*. Therefore, the first light ray 211*e* is still left-handed polarized light after passing through the semi-reflective semi-transmissive film 224, and becomes right-handed polarized light after being reflected by the hot mirror 23. The semi-reflective semi-transmissive film 224 does not change a polarization state of a light ray. Therefore, the light ray is still right-handed polarized light after passing through the semi-reflective semi-transmissive film 224. The right-handed polarized light is linearly polarized through the first wave plate 222, and a polarization direction is along an x-axis direction. The first light ray 211*e* is reflected by the reflective polaroid sheet 221, and is still linearly polarized light whose polarization direction is unchanged. After passing through the first wave plate 222, the linearly polarized light forms right-handed polarized light, and after transmitted through the semi-reflective semi-transmissive film 224, the linearly polarized light is still right-handed polarized light. The right-handed polarized light is reflected by the hot mirror 23 to form left-handed polarized light, and the left-handed polarized light is transmitted through the semi-reflective semi-transmissive film 224 and forms linearly polarized light after passing through the first wave plate 222. The linearly polarized light is emitted from the first area 221*a* of the reflective polaroid sheet 221, is irradiated to the image sensor 253 of the compact camera module 25, and is sensed by the compact camera module 25.

As shown in FIG. 14, in this embodiment, reflection quantities and polarization states of the second light ray 211*f* and the first light ray between the reflective polaroid sheet 221 and the hot mirror 23 are the same, and the process is not described again. A difference lies in that the second light ray 211*f* is emitted from the second area 221*b* of the reflective polaroid sheet 221, and cannot be irradiated to the image sensor 253 of the compact camera module 25. In this application, only the first light ray 211*e* is allowed to pass through. This can effectively eliminate a ghost image and improve precision of an eye-movement tracking algorithm.

It can be learned from FIG. 13 that a light ray reflected by the eyeball 200 is folded three times between the reflective polaroid sheet 221 and the hot mirror 23. Therefore, in comparison with photographing the eyeball 200 of the user directly through the lens group 22, the compact camera module 25 may photograph the eyeball 200 of the user at a smaller tilt angle. In conclusion, in this embodiment, on the premise of ensuring that the near-infrared compact camera module 25 photographs the eyeball 200 of the user at a small tilt angle, a position of the compact camera module 25 is set, and a polarization selection manner is used. This greatly reduces ghost images formed by the compact camera module 25.

As shown in FIG. 13, the compact camera module 25 further includes a polaroid sheet 254 located on an in-light side of the image sensor 253. Specifically, the image sensor 253 is a photosensitive chip. The polaroid sheet 254 may be located on a side that is of the camera lens 252 of the compact camera module 25 and that faces away from the image sensor 253, or may be located between the camera lens 252 and the image sensor 253. A polarization direction of the polaroid sheet 254 is the same as that of the reflective polaroid sheet 221. The light ray 211 reflected by the eyeball 200 further forms a third light ray 211*g* emitted to the reflective polaroid sheet 221 of the polarizer, and the third light ray 211*g* is reflected by the reflective polaroid sheet 221 of the polarizer to the compact camera module 25. The polaroid sheet 254 is configured to allow the first light ray 211*e* emitted from the first area 221*a* to enter the image sensor 253, and prevent the third light ray 211*g* that is reflected by the reflective polaroid sheet 221 of the polarizer to the compact camera module 25 from entering the image sensor 253. It may be understood that a polarization state and a propagation path of the third light ray 211*g* are different from those of the first light ray 211*e* emitted from the first area 221*a*, and the polarization state and the propagation path of the third light ray 211*g* are different from those of the second light ray 211*f* emitted from the second area 221*b*. That is, in this embodiment, the polaroid sheet 254 is disposed on an in-light side of the image sensor 253 of the compact camera module 25, to prevent the third light ray 211*g* that is reflected by the reflective polaroid sheet 221 of the polarizer to the compact camera module 25 from entering the image sensor 253. This reduces ghost images caused by light rays from other propagation paths, and improves user experience.

Figure 15:
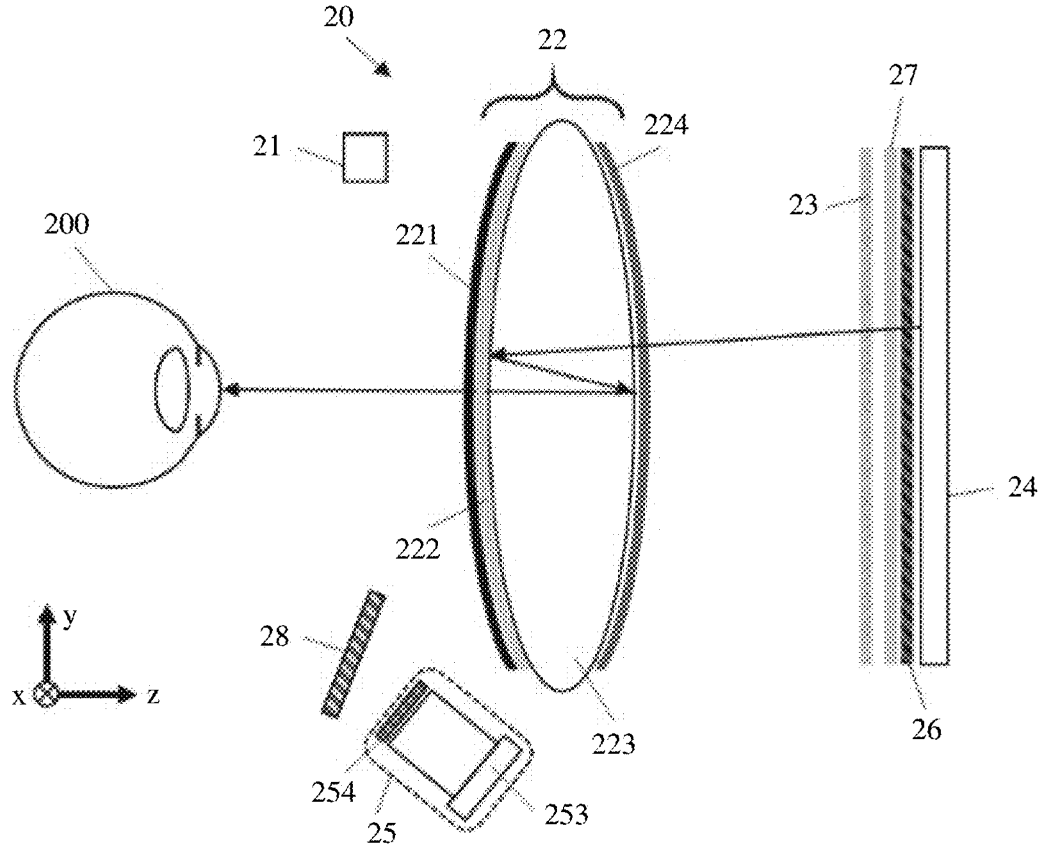
FIG. 15 is a schematic diagram of a structure of a fourth embodiment of an augmented reality component in the structure shown in FIG. 1.
Figure 16:
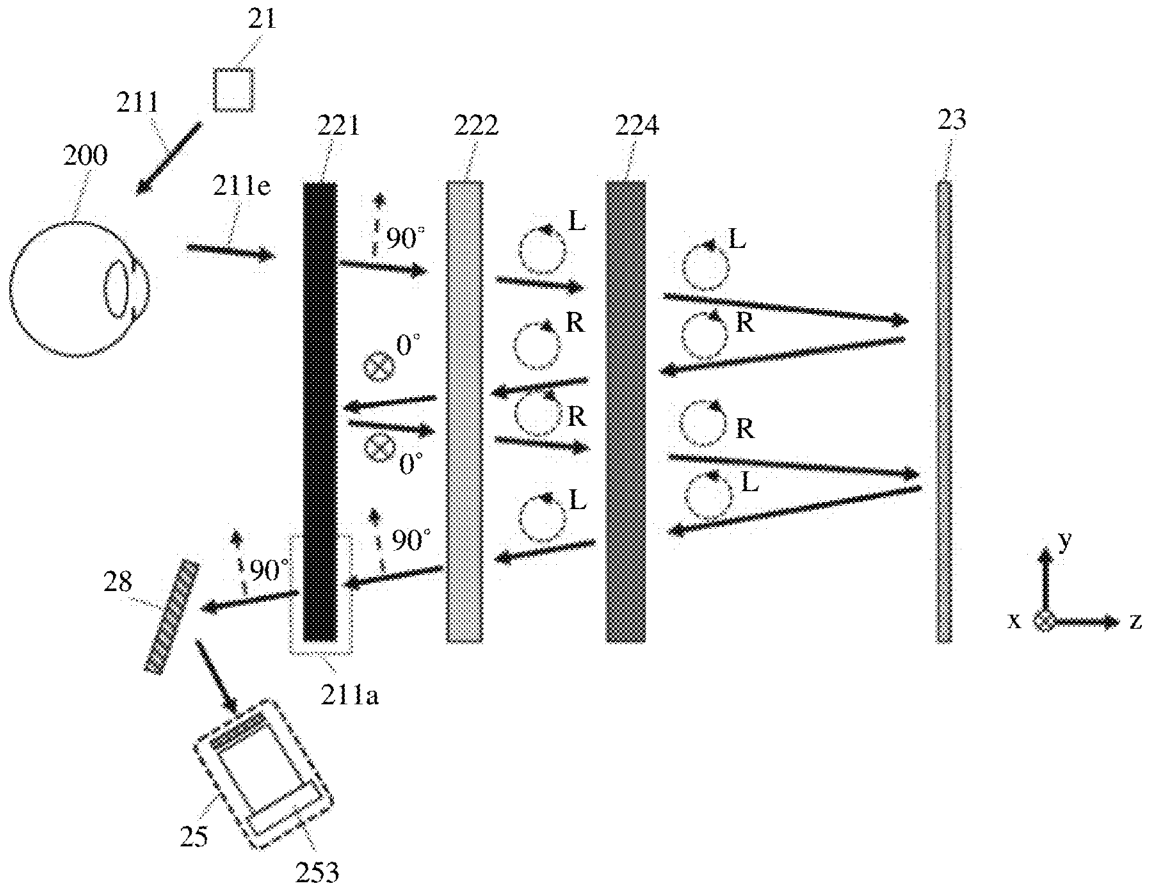
FIG. 16 is an optical path diagram of a light ray emitted by a light source in the structure shown in FIG. 15.
Figure 17:
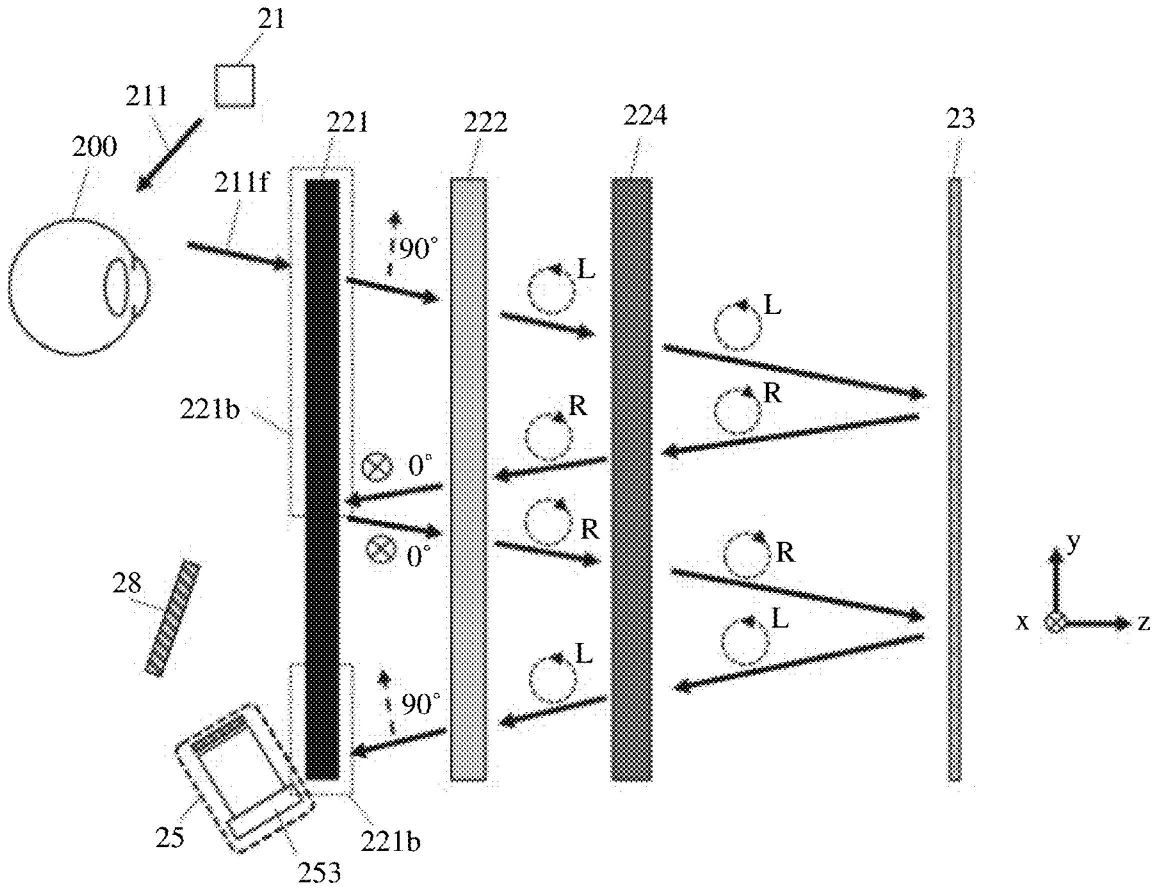
FIG. 17 is another optical path diagram of a light ray emitted by a light source in the structure shown in FIG. 15.

FIG. 15 is a schematic diagram of a structure of a fourth embodiment of the augmented reality component 20 in the structure shown in FIG. 1. FIG. 16 is an optical path diagram of a light ray emitted by a light source 21 in the structure shown in FIG. 15. FIG. 17 is another optical path diagram of a light ray emitted by the light source 21 in the structure shown in FIG. 15.

This embodiment is roughly the same as the third embodiment. A difference lies in that an in-light side of a compact camera module 25 in this embodiment faces a reflective polaroid sheet 221 through a reflector 28. Specifically, the augmented reality component 20 includes the reflector 28. The reflector 28 is located on the in-light side of the compact camera module 25, and a reflective surface of the reflector 28 faces the in-light side of the compact camera module 25 and faces the reflective polaroid sheet 221. The reflector 28 is configured to reflect a first light ray 211*e* to the in-light side of the compact camera module 25. An optical axis of the compact camera module 25 is inclined relative to an optical axis of a lens group 22. The first light ray 211*e* that is formed by reflecting a light ray of the light source 21 three times between the reflective polaroid sheet 221 and a hot mirror 23 enters the compact camera module 25. Therefore, a tilt angle of the optical axis of the compact camera module 25 relative to the optical axis of the lens group 22 is smaller than those in the first embodiment and the second embodiment. This is convenient for the compact camera module 25 to photograph the first light ray 211*e*, reduces a phase difference and distortion of the compact camera module 25, and improves eye-movement tracking precision.

To clearly describe a process in which the compact camera module 25 photographs an eyeball 200 of a user, FIG. 15 shows polarization states when a light ray 211 reflected by the eyeball 200 passes through different elements in a process of reaching an image sensor 253 of the compact camera module 25. The light ray 211 emitted from the light source 21 is natural light, and forms the first light ray 211*e* after being reflected by the eyeball 200 of the user. The first light ray 211*e* is still natural light. After passing through the reflective polaroid sheet 221, the first light ray 211*e* is modulated into linearly polarized light whose polarization direction is perpendicular to an x axis. A fast-axis direction of a first wave plate 222 and the x axis form an angle of 45°, and after the first light ray 211*e* passes through the first wave plate 222, a polarization state of the first light ray 211*e* is modulated into left-handed polarized light. A semi-reflective semi-transmissive film 224 does not change the polarization state of the first light ray 211*e*. Therefore, the first light ray 211*e* is still left-handed polarized light after passing through the semi-reflective semi-transmissive film 224, and becomes right-handed polarized light after being reflected by the hot mirror 23. The semi-reflective semi-transmissive film 224 does not change the polarization state of the first light ray 211*e*. Therefore, the first light ray 211*e* is still right-handed polarized light after passing through the semi-reflective semi-transmissive film 224. The right-handed polarized light is linearly polarized through the first wave plate 222, and a polarization direction is along an x-axis direction. The first light ray 211*e* is reflected by the reflective polaroid sheet 221, and is still linearly polarized light whose polarization direction is unchanged. After passing through the first wave plate 222, the linearly polarized light forms right-handed polarized light, and after transmitted through the semi-reflective semi-transmissive film 224, the linearly polarized light is still right-handed polarized light. The right-handed polarized light is reflected by the hot mirror 23 to form left-handed polarized light, and the left-handed polarized light is transmitted through the semi-reflective semi-transmissive film 224 and forms linearly polarized light after passing through the first wave plate 222. The linearly polarized light is emitted from the reflective polaroid sheet 221. The first light ray 211*e* is reflected by the reflector 28, is irradiated to the image sensor 253 of the compact camera module 25, and is sensed by the compact camera module 25.

As shown in FIG. 17, in this embodiment, reflection quantities and polarization states of a second light ray 211*f* and the first light ray 211*e* between the reflective polaroid sheet 221 and the hot mirror 23 are the same, and the process is not described again. A difference lies in that the second light ray 211*f* is emitted from a second area 221*b* of the reflective polaroid sheet 221, and cannot be irradiated to the image sensor 253 of the compact camera module 25. In this application, only the first light ray 211*e* is allowed to pass through. This can effectively eliminate a ghost image and improve precision of an eye-movement tracking algorithm.

It can be learned from FIG. 15 that the light ray 211 reflected by the eyeball 200 is folded three times between the reflective polaroid sheet 221 and the hot mirror 23. At the same time, the light ray 211 is further reflected once by the reflector 28. Therefore, in comparison with the solution of the third embodiment, the compact camera module 25 may photograph the eyeball 200 of the user at a smaller tilt angle. In conclusion, in this embodiment, on the premise of ensuring that the near-infrared compact camera module 25 photographs the eyeball 200 of the user at a small tilt angle, a position of the compact camera module 25 is set, and a polarization selection manner is used. This greatly reduces ghost images formed by the compact camera module 25.

The foregoing descriptions are merely some embodiments and implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An eye-movement tracking apparatus, comprising:

a light source;

a lens group;

a hot mirror, wherein the hot mirror is disposed on an out-light side of the lens group; and a compact camera module, wherein the compact camera module comprises an image sensor and an optical component located on an in-light side of the image sensor, the light source is configured to emit a light ray to an eyeball of a user, the light ray is reflected by the eyeball to form a first light ray and a second light ray that are emitted to the lens group, the first light ray is reflected by the hot mirror for N times to form a third light ray, the second light ray is reflected by the hot mirror for M times to form a fourth light ray, both M and N are natural numbers, M and N are different, and the optical component allows the third light ray to enter the image sensor and prevents the fourth light ray from entering the image sensor, wherein a polarization of the third light ray is different from a polarization of the fourth light ray, and the polarization of the third light ray and the polarization of the fourth light ray are determined by the number of times the third light ray and the fourth light ray respectively are reflected by the hot mirror.

2. The eye-movement tracking apparatus according to claim 1, wherein the lens group comprises a reflective polaroid sheet, a first wave plate, and a lens, wherein the first wave plate is disposed on an in-light side of the lens, the reflective polaroid sheet is disposed on a side of the first wave plate that faces away from the lens, the optical component comprises a first linear polaroid sheet and a second wave plate, the first linear polaroid sheet is located between the second wave plate and the image sensor, a polarization direction of the reflective polaroid sheet is the same as or perpendicular to that of the first linear polaroid sheet, and both the first wave plate and the second wave plate are quarter-wave plates.

3. The eye-movement tracking apparatus according to claim 1, wherein the lens group comprises a reflective polaroid sheet, a first wave plate, and a lens, wherein the first wave plate is disposed on an in-light side of the lens, the reflective polaroid sheet is disposed on a side of the first wave plate that faces away from the lens, the optical component comprises a first circular polaroid sheet, a rotation direction of the first circular polaroid sheet is the same as that of the first wave plate, and a polarization direction of the first circular polaroid sheet is the same as or perpendicular to that of the reflective polaroid sheet.

4. The eye-movement tracking apparatus according to claim 2, wherein the lens group comprises a semi-reflective semi-transmissive film, and the semi-reflective semi-transmissive film is disposed on a side of the lens that faces away from the first wave plate.

5. The eye-movement tracking apparatus according to claim 4, wherein a transmittance of the semi-reflective semi-transmissive film in a first band is greater than 95%, and a reflectivity is less than 1%, wherein the first band is a frequency band to which the light ray belongs.

6. The eye-movement tracking apparatus according to claim 1, wherein:

an in-light side of the compact camera module faces the hot mirror, and is configured to receive a light ray reflected by the hot mirror; or an in-light side of the compact camera module faces the lens group, and is configured to receive a light ray emitted from the lens group.

7. An eye-movement tracking apparatus, comprising:

a light source;

a polarizer;

a hot mirror, wherein the hot mirror is located on an out-light side of the polarizer; and a compact camera module, wherein the compact camera module is disposed on a side of the polarizer that faces away from the hot mirror, the light source is configured to emit a light ray to an eyeball of a user, the light ray is reflected by the eyeball to form a first light ray and a second light ray that are emitted to the polarizer, wherein, after being propagated between the polarizer and the hot mirror, the first light ray is emitted from a first area of the polarizer, wherein, after being propagated between the polarizer and the hot mirror, the second light ray is emitted from a second area of the polarizer, and wherein a receive field of view of the compact camera module covers the first area and is staggered in the second area, wherein a polarization of the first light ray is different from a polarization of the second light ray, and the polarization of the first light ray and the polarization of the second light ray are determined by a number of times the first light ray and the second light ray respectively are reflected by the hot mirror.

8. The eye-movement tracking apparatus according to claim 7, wherein the polarizer comprises a reflective polaroid sheet and a first wave plate, and the first wave plate is located between the reflective polaroid sheet and the hot mirror.

9. The eye-movement tracking apparatus according to claim 8, wherein the compact camera module comprises an image sensor and a polaroid sheet, wherein the polaroid sheet is located on an in-light side of the image sensor, the light ray reflected by the eyeball further forms a third light ray emitted to the polarizer, the third light ray is reflected by the polarizer to the compact camera module, and wherein the polaroid sheet is configured to:

allow the first light ray emitted from the first area to enter the image sensor; and prevent the third light ray reflected by the polarizer to the compact camera module from entering the image sensor.

10. The eye-movement tracking apparatus according to claim 8, wherein the eye-movement tracking apparatus further comprises a semi-reflective semi-transmissive film, and the semi-reflective semi-transmissive film is located between the first wave plate and the hot mirror.

11. The eye-movement tracking apparatus according to claim 10, wherein a transmittance of the semi-reflective semi-transmissive film in a first band is greater than 95%, and a reflectivity is less than 1%, wherein the first band is a frequency band to which the light ray belongs.

12. The eye-movement tracking apparatus according to claim 10, wherein the eye-movement tracking apparatus further comprises a lens, and the lens is disposed between the first wave plate and the semi-reflective semi-transmissive film.

13. The eye-movement tracking apparatus according to claim 12, wherein an in-light side of the compact camera module faces the reflective polaroid sheet, and wherein the in-light side of the compact camera module is configured to receive a light ray emitted from the polarizer.

14. The eye-movement tracking apparatus according to claim 13, wherein the eye-movement tracking apparatus further comprises a reflector, and the reflector is configured to reflect the light ray to the in-light side of the compact camera module.

15. An electronic device, wherein the electronic device comprises a display screen and an eye-movement tracking apparatus comprising:

a light source;

a lens group;

a hot mirror, wherein the hot mirror is disposed on an out-light side of the lens group; and a compact camera module;

wherein the compact camera module comprises an image sensor and an optical component located on an in-light side of the image sensor, the light source is configured to emit light ray to an eyeball of a user, the light ray is reflected by the eyeball to form a first light ray and a second light ray that are emitted to the lens group, the first light ray is reflected by the hot mirror for N times to form a third light ray, the second light ray is reflected by the hot mirror for M times to form a fourth light ray, both M and N are natural numbers, M and N are different, and the optical component allows the third light ray to enter the image sensor and prevents the fourth light ray from entering the image sensor; and wherein the display screen is disposed on a side of the hot mirror that faces away from the lens group or a polarizer, and wherein a polarization of the third light ray is different from a polarization of the fourth light ray, and the polarization of the third light ray and the polarization of the fourth light ray are determined by the number of times the third light ray and the fourth light ray respectively are reflected by the hot mirror.

16. The electronic device according to claim 15, wherein the electronic device further comprises a frame, wherein the frame comprises a body and temples connected to the body, the lens group, or the polarizer, wherein the display screen is fastened to the body, and wherein the light source and the compact camera module are fastened to the body or the temples.

17. The electronic device according to claim 15, wherein the electronic device further comprises a second linear polaroid sheet and a third wave plate, the second linear polaroid sheet is disposed on an out-light side of the display screen, and the third wave plate is disposed between the second linear polaroid sheet and the hot mirror.

18. The electronic device according to claim 15, wherein the lens group comprises a reflective polaroid sheet, a first wave plate, and a lens, wherein the first wave plate is disposed on an in-light side of the lens, the reflective polaroid sheet is disposed on a side of the first wave plate that faces away from the lens, the optical component comprises a first linear polaroid sheet and a second wave plate, the first linear polaroid sheet is located between the second wave plate and the image sensor, a polarization direction of the reflective polaroid sheet is the same as or perpendicular to that of the first linear polaroid sheet, and both the first wave plate and the second wave plate are quarter-wave plates.

19. The electronic device according to claim 18, wherein the lens group comprises a semi-reflective semi-transmissive film, and the semi-reflective semi-transmissive film is disposed on a side of the lens that faces away from the first wave plate.

20. The electronic device according to claim 15, wherein the lens group comprises a reflective polaroid sheet, a first wave plate, and a lens, wherein the first wave plate is disposed on an in-light side of the lens, the reflective polaroid sheet is disposed on a side of the first wave plate that faces away from the lens, the optical component comprises a first circular polaroid sheet, a rotation direction of the first circular polaroid sheet is the same as that of the first wave plate, and a polarization direction of the first circular polaroid sheet is the same as or perpendicular to that of the reflective polaroid sheet.

* * * * *